United States Patent [19]

Hosoya et al.

[11] Patent Number: 4,967,231
[45] Date of Patent: Oct. 30, 1990

[54] APPARATUS FOR FORMING AN ELECTROPHOTOGRAPHIC LATENT IMAGE

[75] Inventors: Masahiro Hosoya, Yokohama; Shuitsu Sato, Kawasaki; Mitsunaga Saito, Tokyo; Tsutomu Uehara, Yokosuka; Mitsuharu Endo, Susono; Yukio Futamata, Tagata, all of Japan

[73] Assignees: Kabushiki Kaisha Toshiba, Kanagawa; Electric Co., Ltd., Tokyo, both of Japan

[21] Appl. No.: 290,538

[22] Filed: Dec. 27, 1988

[30] Foreign Application Priority Data

Dec. 29, 1987 [JP] Japan .................. 62-336159
Jan. 27, 1988 [JP] Japan .................. 63-016747

[51] Int. Cl.$^5$ .................. G03G 15/02; G03G 15/06; G03G 15/14; G03G 21/00
[52] U.S. Cl. .................. 355/219; 355/259; 355/271; 355/296; 361/221; 118/652; 118/653
[58] Field of Search .............. 355/271, 273, 274, 277, 355/296, 297, 245, 259, 219; 118/651, 652, 653, 661, 656; 361/212, 221, 225

[56] References Cited

U.S. PATENT DOCUMENTS

| | | |
|---|---|---|
| 3,754,963 | 8/1973 | Chang . |
| 3,924,943 | 12/1975 | Fletcher .................. 355/274 |
| 4,063,808 | 12/1977 | Simpson .................. 355/274 |
| 4,360,262 | 11/1982 | Genthe .................. 361/221 X |
| 4,408,862 | 10/1983 | Takano et al. .................. 118/656 X |
| 4,469,435 | 9/1984 | Nosaki et al. .................. 118/652 X |
| 4,521,098 | 6/1985 | Hosoya et al. . |
| 4,760,422 | 7/1988 | Seimiya et al. .................. 118/653 X |
| 4,827,305 | 5/1989 | Enoguchi et al. .................. 118/661 X |
| 4,827,868 | 5/1989 | Tarumi et al. .................. 118/653 X |

FOREIGN PATENT DOCUMENTS 1594445 7/1981 United Kingdom .

*Primary Examiner*—R. L. Moses
*Attorney, Agent, or Firm*—Finnegan, Henderson, Farabow, Garrett, and Dunner

[57] ABSTRACT

A developing device effects desirable development when the amount of charging of toner, q (C/g), the amount of toner deposited on the surface of a developing roller per unit area, m (g/cm$^2$), the speed of movement of the surface of the developing roller, v (cm/sec), the available length of the developing roller, l (cm), and the magnitude of electric resistance between the surface of the developing roller and a power source for developing bias, R ($\Omega$), are adjusted so as to satisfy the formula, $|q|m \leq 100/vlR$. The developing device produces a developed image desirable in quality and free from background fogging when the magnitude of a developing electric current, I (A), is adjusted so as to satisfy the formula, $R \leq 200/I$. Further, when a charging device, an electrostatic latent image forming device, a transfer device, a cleaning device, a discharge device, a charging and cleaning device, an electrostatic latent image forming and cleaning device, a developing and cleaning device, or a discharging and cleaning device is provided with an elastic electroconductive roller composed of an elastic roller base and a flexible conductor layer, the device is allowed to decrease size and lower price, curb the decline of capacity due to protracted use, and preclude the occurrence of dispersion of characteristic, efficiency, or performance.

54 Claims, 19 Drawing Sheets

APPARATUS FOR FORMING AN ELECTROPHOTOGRAPHIC LATENT IMAGE

FIELD OF THE INVENTION AND RELATED ART STATEMENT

This invention concerns an apparatus for forming an electrophotographic latent image, including elements performing the steps of charging, exposure, development, transfer, cleaning, and discharging, performed in an electrophotographic system or a xerographic system, and more particularly related to a charging device, an electrostatic latent image forming device, a developing device, a transfer device, a cleaning device, a discharging device, a charging and cleaning device, an electrostatic latent image forming and cleaning device, a developing and cleaning device, and a discharging and cleaning device which are inexpensive and compact and capable of producing images of high quality.

The electrophotographic process basically comprises a charging treatment to be performed on an electrostatic latent image retaining layer, a treatment for selective exposure to light of the surface undergoing the charging treatment, a treatment (developing treatment) for selective deposition of a toner on the surface undergoing the treatment of exposure, an operation of transfer of the toner from the surface to a copying paper, a treatment for cleaning the surface of the electrostatic latent image retaining layer for removal of residual toner, and a discharging treatment to be performed on the layer mentioned above.

As a charging device, corona charging devices and contact charging devices have been known to the art. The contact charging devices include brush charging devices using an electroconductive brush, and roller charging devices using an electroconductive rubber roller.

The well-known corona charging device has found the most popular acceptance for actual use. It has a disadvantage, however, that since it utilizes corona discharge for its operation, and therefore, gives rise to a large amount of by-products of discharging, such as ozone, and since these products deteriorate the electrostatic latent image retaining layer and exert a harmful effect on the human body, these by-products of discharging must be removed by the use of an ozone filter, for example. Further, since it requires as a corona voltage a high potential on the order of 5 KV, it inevitably entails a disadvantage that the power source device used therefor is unduly large in size and in current capacity.

In contrast, such contact charging devices as brush charging devices using an electroconductive bush, and roller charging devices using an electroconductive rubber roller, enjoy an advantage that they give rise to substantially no by-product of discharging and operate with a relatively low voltage generally on the order of 500 V to 1,000 V. They nevertheless suffer from the following drawbacks, which prevent them from finding extensive utility in the intended applications.

The brush charging device fulfils the role of charging the electrostatic latent image retaining layer by applying a voltage to a brush made of electroconductive fibers and rubbing the surface of the layer mentioned above with the brush. This brush charging device, no matter whether it is of the type using a stationary brush or the type using a roller-like rotary brush, is capable of charging the article under treatment to a voltage approximating to the aforementioned applied voltage (Japanese Patent Application Disclosure SHO No. 58(1983)-72,981). This device, however, has a disadvantage that the brush of the description given above after a protracted service suffers from a loss of charging ability because the fibers of the brush have their brittleness impaired and eventually come to tilt in one direction.

The roller-like rotary brush generally is not so susceptible to the aforementioned phenomenon of tilting of fibers as the stationary brush. Since a cylindrical article having bristles implanted therein is difficult to construct, however, it is generally necessary to use a pile fabric, like a so-called velvet, wrapped around a roller. The pile fabric thus used inevitably forms a seam and this seam prevents the surface under treatment from being charged uniformly.

The roller charging device using an electroconductive rubber roller effects the desired charging by applying a voltage to the electroconductive rubber roller and allowing the rubber roller to come into contact with the electrostatic latent image retaining unit and roll thereon at the equal surface speed (Japanese Patent Application Disclosure SHO No. 58(1983)-49,960). This device, however, has a disadvantage that it is more liable to induce uneven charging than the brush charging device, though it can avoid the aforementioned drawbacks attendant on the brush fibers.

The rubber surface generally has a high friction on the surface of the latent image retaining layer. More often than not, therefore, the spatial dispersion in the magnitude of the resistance offered by the electroconductive rubber roller entails uneven charging. Further, the electroconductive rubber roller entails uneven charging. Further, the electroconductive rubber roller is liable to induce uneven charging because it generally exhibits high rigidity and, therefore, renders it difficult to produce an ample nipping width with the latent image retaining layer. There is another problem that the plasticizer which exudes to the rubber surface compels the toner to adhere to the roller surface and consequently impairs the charging capacity of the rubber roller.

The various problems encountered by the contact charging device as described above invariably induce impairment of image quality. With the conventional contact charging device, therefore, it has been difficult to obtain images of high quality.

The corona charging device described above has been in popular use to date as an electrostatic latent image forming device. It is disadvantageous, however, in respect that it entails generation of ozone and requires use of a high-voltage power source.

There are other electrostatic latent image forming devices such as, for example, (A) a device for "electrophotographic recording using no corona discharging means" (NTT) and (B) a device for "a new electrophotographic process that does not use corona charging" (Fujitsu).

The device of (A) enables the steps of cleaning, charging, exposure, and development to be carried out substantially simultaneously without use of corona discharge means and, therefore, has an advantage that it lends itself to a reduction in the size of the electrophotographic apparatus. Since this device relies for the charging of the toner or the sensitive material on the injection of a potential into an electric field, it inevitably requires use of an electroconductive toner. Incidentally no practicable method has yet been developed for enabling an image of electroconductive toner to be transferred onto plain paper. Thus, this device has a disadvantage that it necessitates use of a special paper developed exclusively for this transfer. Further since the development needs magnetism, the device is required to use a magnetic toner. This fact entails a disadvantage that this device cannot be easily adapted for production of color images.

The device of (B) has an advantage that it enables the steps of cleaning, charging, exposure, and development to be carried out substantially simultaneously, permits a reduction in size of the electrophotographic apparatus, and allows easy transfer of an image of toner onto plain paper. This device requires the development to be performed in two separate steps. These two steps are to be carried out at substantially the same place and time and, therefore, the device must have a construction permitting simultaneous application of two different voltages to the developing roller. As the developer, therefore, this device requires use of a two-component magnetic toner (and does not suit the one-component development system). It has another disadvantage that it uses a magnetic toner and cannot be easily adapted to permit production of color images.

As yet another means for the formation of an electrostatic latent image, the technique disclosed in Japanese Patent Application Disclosure SHO No. 56(1981)-111,858 may be mentioned. To be specific, this technique uses a recording head 6 which is formed, as illustrated in FIG. 1, by disposing a photoconductive layer 1, a transparent electrode 2, an opaque electrode 3, and a solitary conductor 4 on a transparent support 5. When a voltage, Va, is applied between the opaque electrode 3 and the transparent electrode 2 and, at the same time, a light signal is projected from the transparent support 5 side, the resistance of the photoconductor 1 between the transparent electrode 2 and the solitary conductor 4 is varied and the resistance of the photoconductor 1 between the opaque electrode 3 and the solitary conductor 4 is not varied and the potential on the solitary conductor 4 is varied. As the result, an electrostatic latent image is formed on an insulting layer 7 with the solitary conductor 4 as an electrostatic recording electrode.

The recording head 6, therefore, has an equivalent circuit as illustrated in FIG. 2. The potential, Vo, of the solitary conductor 4 is expressed by the following formula.

$$Vo = \frac{R_2}{R_1 + R_2} \cdot Va = \frac{Va}{R_1/R_2 + 1}$$

The electrostatic latent image to be formed on the insulating layer 7 can be developed with a toner and transferred by the conventional technique onto a plain paper.

This recording system is disadvantageous in the respect that the insulating layer 7 is required to possess soft consistency for the purpose of ensuring safe contact between the solitary electrode and the insulating layer 7. Further, the solitary electrode is not easily endowed with the flexibility of rubber, the recording head is required to possess high durability, and yet be incapable of bringing about any adverse effect on the soft insulating layer 7. Further, if cannot be constructed in the shape of a roller fit for rotation and, therefore, is destined to be rubbed at one and the same position. Finally the applied voltage, Va, necessary for this system, is higher than any other charging system, because the potential Vo is obtained by dividing the applied voltage, Va.

As means of development, the device operated by forming a thin layer of a one-component developer made solely of a nonmagnetic toner on the surface of a toner carrier possessing elasticity, electroconductivity, and rough surface, and bringing this toner layer into contact with an electrostatic latent image in such a manner as to produce no relative motion, has been known to the art (U.S. Pat. Nos. 3,754,968 and 3,731,146 and Japanese Patent Publication SHO No. 51(1976)-86,070 and SHO No. 52(1977)36,414). This device has many merits such as simplification of the apparatus and an easy adaptation of the apparatus for production of color images. The inventors' experiment conducted on the apparatus as disclosed has revealed that this developing device has the following problems.

(1) As one important characteristic of the aforementioned method of development by an application of voltage, it is clearly stated that the toner layer surface and the electrostatic latent image should be moved in such a manner as to produce substantially no relative peripheral velocity. The results of the experiment show that the developed image obtained under the conditions mentioned above lacks sharpness and betrays conspicuous signs of background fogging and uneven density. When a relative velocity is allowed to occur, the developed image is very sharp, free from background fogging, uniform, and high in density because the toner particles are rolled and slid at the position of contact between the toner layer and the latent image to a point where the toner particles contribute to accelerating the charging and trimming the image.

(2) When the method of development by application of voltage is carried out, a current (hereinafter referred to as "developing current") flows through the electric circuit extending from the toner carrier to the power source for bias of development because the charged toner particles on the toner carrier are transferred onto the latent image surface. The magnitude of the resistance of the surface of the toner carrier, or that of the resistance between the toner carrier surface and the power source for bias of development, must be kept from exceeding a prescribed level. In the prior patent publications cited above, virtually no idea is disclosed as a solution of this point.

(3) Since the developing current mentioned above is caused mainly by the movement of toner particles, it depends on the extent of toner charging, the amount of the toner deposited on the latent image, the velocity of the movement of the toner carrier surface, and the size of the toner carrier, for example. The potential on the toner carrier surface or the magnitude of working bias of development is varied by the relation of these factors with the aforementioned magnitude of resistance, possibly to such an extent that the produced image betrays very poor quality as evinced by conspicuous signs of fogging and insufficient density.

Regarding point (1) of the problematic points described above, it is disclosed in Japanese Patent Publication SHO No. 60(1985)12,67 and Japanese Patent Application Disclosure SHO No. 53(1978)-23,638, for example, that the image quality is improved by moving the toner carrier faster than the electrostatic latent image.

Regarding the point (2), various proposals have been made as to the preferred range of the magnitude of volume resistance on the surface of the toner carrier. To be specific, use of a toner carrier having an electroconductivity of no more than $10^5\Omega$. cm is recommended in Japanese Patent Publication SHO No. 60(1985)-22,352, use of one no more than $10^8\Omega$. cm in electroconductivity in Japanese Patent Publication SHO No. 62(1987)-3,949, use of one no less than $10^{13}\Omega$. cm in electroconductivity in Japanese Utility Model Publication SHO No. 62(1987)-35,097, and use of one approximating to $10^8\Omega$. cm in electroconductivity in Japanese Patent Publication SHO No. 63(1988)-26,388.

The fact that the preferred range of the magnitude of resistance varies from one invention to another as shown above implies that the proper conditions are varied by the several factors indicated in the aforementioned point (3). It is, therefore, difficult to obtain an image of good quality unless overall balance of these factors is taken into due consideration.

As means of image transfer, it has been heretofore customary generally to use the aforementioned corona discharge device, though this device entails such drawbacks as generation of ozone and the necessity of a high-voltage power source.

One transfer device which overcomes these drawbacks has been disclosed in Japanese Patent Application Disclosure SHO No. 54(1979)-19,750, for example. Specifically, this transfer device consists of a transfer drum which comprises a partially excised electrostatic latent image retaining roll and a conductor sheet stretched across the excision in the roll, and affects the transfer aimed at by imparting a potential difference between the conductor sheet and the electrostatic latent image retaining layer. In this case, however, the contact width between the transfer paper and the electrostatic latent image retaining roll is too narrow to obtain a sufficiently high transfer efficiency because the electrostatic force of attraction generation between the conductor sheet and the electrostatic latent image retaining layer is weak. There arises a possibility that the conductor sheet warps so much as to induce poor contact and result in partial loss of transfer.

A transfer device using a bias roller made of electroconductive rubber has known to the art as a compact inexpensive version of the electrostatic transfer device. It has the following drawbacks. For the rubber as the material for the bias roller to be sufficiently electroconductive, it incorporates therein an electroconductive, it incorporates therein an electroconductive substance such as electroconductive carbon and inevitably gains in rigidity (above 45 degrees) so much as to render it difficult to produce the minimum contact width (no less than 2 mm) between the transfer roller and the electrostatic latent image layer retaining layer required for the purpose of acquiring high transfer efficiency and producing a uniform transfer image, or suffer the pressure between the transfer roller and the electrostatic latent image retaining layer to increase to an unduly high level. As the result, this device fails to effect perfect transfer of an image of high density or produces an image containing a missing part at the center (phenomenon of central missing). When the electroconductive rubber used for the bias roller has a soft constitution, there results a disadvantage that the plasticizer contained in the rubber exudes to the rubber surface, causing the toner to adhere to the roller surface, and consequently impairs the operational efficiency of the transfer device.

The cleaning device which has been in popular use to date is adapted to remove the residual toner from the electrostatic latent image retaining layer by pressing the edge of a blade made of polyurethane rubber, for example, against the aforementioned layer and causing the blade to scrape the toner off the layer surface. The use of the rubber blade of this nature, however, is liable to increase the force of friction exerted on the electrostatic latent image retaining layer and necessitate an addition to the driving force required for the operation of the cleaning device. The rubber edge tends to inflict a scar on the surface of the electrostatic latent image retaining layer. If the rubber blade sustains any injury, it is no longer useful for the purpose of cleaning.

For the solution of these drawbacks, there has been developed a cleaning device adapted to give the electrostatic latent image retaining layer an electrical cleaning by the use of a fur brush. Since this cleaning device uses a fur brush, it is so expensive as to find only limited utility in part of electrophotographic devices.

The discharging device heretofore in popular use generally relies for its operation on the agency of light such as LED. This device leaves little room for a further reduction in cost. A further compaction of the device renders it difficult for the discharging device to be approximated to the charging part without entailing leakage of light. Moreover, the electrostatic latent image retaining layer cannot be applied to anything other than a photosensitive material.

A brush discharging device using an electroconductive brush has been known to the art as a version which is free from the drawbacks mentioned above. This device discharges the electrostatic latent image retaining layer by grounding or applying a prescribed voltage to a brush made of electroconductive fibers and causing this brush to rub the surface of the electroconductive latent image retaining layer. This device comes in two types, one type using a stationary brush and the other type using a roller-like rotary brush. Incidentally, the stationary brush has a disadvantage that it entails the phenomenon of tilted fibers as mentioned above and the roller-like rotary brush a disadvantage that it permits no appreciable reduction in cost as compared with the version using LED, for example, and the discharge is not attained evenly.

A discharging device using an electroconductive rubber roller has been also known to the art. This device, however, has been prevented from utility in actual use because of the disadvantage that it effects the discharging unevenly, suffers deposition of toner to the roller surface, and entails a decline in the discharging capacity.

A combination type device which simultaneously cleans a charging member (electrostatic latent image retaining layer) and charges it by causing the aforementioned roller-like rotary brush to rub the charging member and, at the same time, applying a voltage to the brush has been also known to the art (Japanese Patent Application Disclosure SHO No. 58(1983)-72,981). Owing to the construction described above, this device has an advantage that it permits simplification of the apparatus and allows an addition to the service life of the charging member. It nevertheless is disadvantageous in that, similarly to the roller-like rotary brush, this device does not easily permit a further reduction in cost and produces uneven discharging.

In the combination charging-cleaning device of the type described above, it is possible to effect both discharging and cleaning by adjusting the applied voltage so that the charging member will be charged to a prescribed potential. In spite of this adjustment, the device continues to suffer from the disadvantage that it produces uneven discharging and effects cleaning insufficiently.

OBJECT AND SUMMARY OF THE INVENTION

An object of this invention is to provide an apparatus for performing an electrophotographic process, including a charging device, an electrostatic latent image forming device, a developing device, a transfer device, a cleaning device, a discharging device, a charging-cleaning device, a developing-cleaning device, and a discharging-cleaning device, which is compact and low in price.

Another object of this invention is to provide an apparatus for performing an electrophotographic process, including a charging device, an electrostatic latent image forming device, a developing device, a transfer device, a cleaning device, a discharging device, a charging-cleaning device, an electrostatic latent image forming-cleaning device, a developing-cleaning device, and a discharging-cleaning device, which is capable of maintaining an image of high quality.

A further object of this invention is to provide an apparatus for performing an electrophotographic process, including a charging device, an electrostatic latent image forming device, a developing device, a transfer device, a cleaning device, a discharging device, a charging-cleaning device, a developing-cleaning device, and a discharging-cleaning device which enjoys a long service life, suffers only a slight decline of operational efficiency after a protracted service, and precludes the occurrence of dispersion in quality, efficiency, or capacity.

Yet another object of this invention is to provide an apparatus for performing an electrophotographic process, including a charging device, an electrostatic latent image forming device, a developing device, a transfer device, a cleaning device, a discharging device, a charging-cleaning device, an electrostatic latent image forming-cleaning device, a developing-cleaning device, and a discharging-cleaning device which permits common use of component parts.

Still another object of this invention is to provide a developing device which is capable of producing an image sharp, free from background fogging, uniform and high in density.

The first aspect of this invention concerns a developing device for visibly developing an electrostatic latent image formed in an electrostatic latent image retaining layer by forming a thin toner layer on the surface of a toner carrier held under application of a developing bias voltage and causing the thin toner layer to contact the electrostatic latent image retaining layer, which developing device is characterized by the fact that the magnitude of toner charging, q (C/g), the amount of the toner deposited per unit area of the toner carrier surface, m (g/cm$^2$), the velocity of the movement of the toner carrier surface, v (cm/sec.), the available length of the toner carrier, l (cm), and the magnitude of electric resistance between the toner carrier surface and the means for the application of the developing bias voltage, R ($\Omega$), are so adjusted as to satisfy the following conditional formula:

$$|q| = < 100/v\, l\, R$$

The second aspect of this invention concerns a developing device for visibly developing an electrostatic latent image formed in an electrostatic latent image retaining layer by forming a thin toner layer on the surface of a toner carrier held under application of a developing bias voltage and causing the thin toner layer to contact the electrostatic latent image retaining layer, which developing device is characterized by the fact that the developing current, I (A), and the magnitude of electric resistance between the toner carrier surface and the means for the application of the developing bias voltage, R ($\Omega$), are adjusted so as to fulfill the following conditional formula:

$$R \leqq 200/I$$

Now, the developing device of the present invention will be described below with reference to FIG. 3 and FIG. 4.

FIG. 3 is a partial cross section for illustration of the operation of the developing device. A developing roller (toner carrier) 8 is an electroconductive roller having an electroconductive elastomer layer 10 formed on the periphery of a metallic shaft 9. On the surface of this developing roller 8, a toner layer 14 of an insulating one-component non-magnetic toner 12, for example, is formed. When the toner layer 14 is pressed into contact, with an electrostatic latent image retaining roll 11 set to clockwise rotation, and the developing roller 8 to counterclockwise rotation, the electric charge of the latent image on the surface of the electrostatic latent image retaining layer 13 and a developing bias power source 15 connected to the developing roller 8 cooperate to generate a developing electric field and consequently effect transfer of the toner particles 12 onto the surface of the electrostatic latent image retaining layer 13. It is presumed that the electrostatic latent image retaining layer 13 is of a type for negative charging and the toner 12 has undergone triboelectrification to a negative polarity advance by friction against a blade (not shown). Further to the developing roller 8, the developing bias direct-current power source 15 is connected via a protective resistor 17. A negative voltage is applied to the developing roller 8 so that the toner 12 will adhere to the area devoid of distribution of electric charge of latent image on the surface of the electrostatic latent image retaining layer 13, or the area in which the surface potential has been nullified on exposure to light by exposure means (not shown) (i.e. so as to attain reversal development).

First, the developing current to be generated when the development is obtained solely in black throughout the entire surface will be considered. It is assumed that q stands for the magnitude of toner charging (C/g), m for the amount of the toner deposited per unit area of the surface of the developing roller 8 (g/cm$^2$), v for the velocity of the movement of the surface of the developing roller 8 (cm/sec.), l for the available length of the developing roller 8, i.e. the length contributing to the development of a latent image (cm), and R for the magnitude of electric resistance between the surface of the developing roller 8 and the developing bias power source ($\Omega$). The maximum amount of the toner to be transferred from the developing roller 8 to the electrostatic latent image retaining layer 13 per second is vlm (g/sec.). The amount of the electric potential which is transferred per second, therefore, is expressed as qvlm(A). As the result, there is induced an electric current, I [=qvlm(A)] in the direction from the developing roller 8 to the developing bias power source 15. Since an electric resistor 17 of a magnitude of R (Ω) happens to intervene between the surface of the developing roller 8 and the developing bias power source 15, the electric current I gives rise to a potential difference I R between the opposite terminals of the electric resistor 17, with the result that the potential on the surface of the developing roller 8 has a magnitude different from that of the output voltage of the developing bias power source 15. This fact means that an image of high quality is not easily obtained unless the parameters, q, v, l, m, and R are adjusted so that the potential difference I R [=qvlmR (V)] will fall within the allowable range of magnitude.

FIG. 4 represents an equivalent circuit of the device illustrated in the cross section of FIG. 3. The electrostatic latent image retaining layer 13 and the toner layer 14 are depicted by a resistor $R_3$ and a parallel circuit 19 having an electrostatic capacity C. The magnitude of the resistance between the surface of the developing roller 8 and the metallic shaft 9 is denoted by $R_2$ and that of the resistance of the protective resistor 17 by $R_1$. The potential on the surface of the developing roller 8, namely the effective developing bias voltage, is expressed by the potential at the point P in the diagram. Since the magnitudes of the potentials at the point P and the point Q in the diagram increase in proportion as the magnitude of qvlmR increases, the potential difference between the surface of the developing roller 8 and that of the electrostatic latent image retaining layer 13 decreases and the amount of the toner to be transferred to the electrostatic latent image regaining layer 13 decreases. The image to be produced, therefore, has poor quality as manifested in a low density. The aforementioned insufficiency of the density of the produced image may be avoided by setting the absolute value of the output voltage of the developing bias power source 15 at a slightly higher level enough to make up for the decline of the potential difference between the developing roller 8 and the surface of the electrostatic latent image is changed from the aforementioned pattern of solid black to a pattern rich in a white background, the amount of the toner to be deposited on the electrostatic patent image retaining layer 13 is decreased and the developing electric current, |q|vlm, is consequently decreased and the potential difference between the points P and Q is lowered. The increase which occurs consequently in the magnitude of the effective developing bias entails excessive development and background fogging.

The developing device of the present invention is adapted to confine within a narrow range the possible variation in the pattern of the latent image by keeping the potential difference, |q|vlmR, between the points P and Q below 100 V. Without reference to the pattern of the latent image, therefore, the developing device of this invention effects the development advantageously with no sacrifice of the resolving power due to background fogging, decline of density, or excessive development.

Further, a wholly white latent image in the reversal development corresponds to an area of the surface of the electrostatic latent image retaining layer 13 which has been uniformly charged to negative polarity and has not been exposed to light. The output voltage of the developing bias power source 15 is set at a negative voltage of a smaller absolute than the latent image potential just mentioned so as to prevent the negatively charged toner 7 from being transferred onto the electrostatic latent image retaining layer 13. In this case, therefore, the occurrence of the developing electric current due to the transfer of the toner 12 is absent.

The inventor has found that since the surface of the developing roller 8 approximates very closely to the surface of the latent image, part of the surface potential of the electrostatic latent image retaining layer 13 is caused by aerial discharge to migrate in the interior of the toner layer and eventually reach the surface of the developing roller 8. As the result, the developing roller 8 relieves the electrostatic latent image retaining layer 13 of its surface potential and an electric current starts flowing in a direction opposite to that of the electric current I shown in FIG. 3 and FIG. 4. The resistance, R, between the surface of the developing roller 8 and the developing bias power source 15 gives rise to a potential difference I,R and the absolute value of the potential at the point P of FIG. 4 rises in the direction of the surface potential of the electrostatic latent image retaining layer 13. This variation of the potential brings about a decline of the potential difference between the surface of the electrostatic latent image retaining layer 13 and the surface of the developing roller 8 and induces a fogging on a white background.

The developing device of the present invention aims essentially to adjust the potential difference I,R to a level of no more than 200 V and consequently secure a prescribed potential difference between the potential in the white background portion and the effective developing bias and produce a developed image of fine quality free from background fogging.

This invention, as described above, enables the developing conditions necessary for the production of images of fine quality to be set very easily and produces developed images of high quality without exception. Various values have been proposed as the magnitude of the volume resistance of the toner carrier. When the development is performed by using any of these values, images of fine quality are not always obtained.

By this invention, there can be obtained a developing device which is capable of setting the conditions comprehensively reflecting various important parameters and, therefore, is fully fit for practical use.

This invention, when desired, may be embodied in a developing device which uses a non-magnetic one-component toner or a magnetic toner. Of course, this invention manifests its effect conspicuously where an elastomer roller or a rigid developing roller made of metal and resin, for example, is used as the toner carrier.

The developing device of this invention is desired to fulfil the various conditions indicated below.

The width of contact between the toner carrier and the electrostatic latent image retaining layer is desired to be in the range of 0.3 to 6.0 mm. If the contact width is less than 0.3 mm, the toner particles are not sufficiently rolled or slid in the developing nip and the effect of improving the sharpness of image is not fully manifested. Conversely, if the contact width exceeds 6.0 mm, there arises a disadvantage that the non-image part is fogged and the image is smeared.

The pressure of contact between the toner carrier and the electrostatic latent image retaining layer is desired to be no more than 1 kg/cm².

The contact depth between the toner carrier and the electrostatic latent image retaining layer is desired to be in the range of 0.1 mm to 2.0 mm.

The roughness of the surface of the toner carrier is desired to be no more than 2 μm.

The means for forming the thin toner layer is desired to be an elastic member or a rigid member which is pressed against the surface of the toner carrier.

The toner carrier is desired to be provided on the surface thereof with means for applying voltage to the surface thereof so that the absolute value of the potential difference between the image part of the electrostatic latent image and the surface of the toner carrier is no less than 100 V and no more than 600 V.

Preferably, the absolute value of the potential difference between the image part of the electrostatic latent image and the surface of the toner carrier is desired to be no less than 50 V.

The toner carrier is desired to be an elastic electroconductive roller which is provided with a roller base and a flexible electroconductive layer formed on the periphery of the roller base and which is capable of producing a cleaning action.

The peripheral speed of the toner carrier in rotation is desired to be in the range of 1.5 to 7.0 times that of the electrostatic latent image retaining layer in rotation. A deviation of the peripheral speed in either way from this range is not desirable; the amount of the toner to be supplied to the electrostatic latent image retaining layer is not sufficient for the image to be formed in ample density when the peripheral speed is less than the lower limit or the non-image part is fogged or the image is smeared when the peripheral speed is more than the upper limit.

Let Vr stand for the speed of movement of the toner carrier surface, Ve for the speed of movement of the electrostatic latent image retaining layer surface, m for the density of adhesion of the toner layer to be formed on the surface of the toner carrier, namely the weight of the toner adhering to the unit area (1 cm$^2$) of the toner carrier surface (mg/cm$^2$), and M for the amount of toner to be supplied to the unit area of the electrostatic latent image carrying layer surface through contact with the toner carrier (mg/cm$^2$), and the following relation will be established between M and m.

$$M = \frac{Vr}{Ve} \cdot m \tag{1}$$

If the toner carrier is moved at a speed twice that of the electrostatic latent image retaining layer, for example, the toner layer formed with one half the amount of the toner layer required where the movement is made at an equal speed will suffice.

When the toner layer is formed by the use of such a regulating member as a toner distributing blade, the toner particles are charged by the friction between the blade and the toner carrier. To ensure this charging of the toner, the thickness of the toner layer (or the amount of the toner deposited) is desired to be decreased to the fullest possible extent. This is because the uncharged toner particles, namely those toner particles which pass under the toner distributing blade without contacting either the toner carrier or the toner distributing blade, are suffered to mingle into the toner layer and so adhere to the non-image part and eventually induce the phenomenon of background fogging when the toner layer has a large thickness.

The formula (I) indicates that when the speed of the toner carrier surface is increased, the toner layer of a small thickness suffices for producing a developed image of high density and, at the same time, curbing the occurrence of background fogging. Further, the produced image enjoys uniformity of density and sharpness of delineation.

When a difference of speed exists between the surface of the toner carrier and that of the electrostatic latent image retaining layer, the nonuniformity of the toner layer is not directly betrayed in the produced image because the two surfaces rub against each other at the position of development. Particularly when the speed of movement of the surface of the toner carrier is higher, the nonuniform image once deposited on the electrostatic latent image retaining member at the stage preceding the position of development is made uniform by the subsequent portion of the toner layer. Further, during the course of the friction produced as described above, those toner particles which are present between the toner carrier and the electrostatic latent image retaining layer produce a rolling motion and a slipping motion and bring about the effect of gathering toner particles toward the image part. The produced image, therefore, enjoys notably improved sharpness as compared with the image produced when the relative speed of the toner carrier and the electrostatic latent image retaining layer is zero.

By the well-known magnetic brush development method, no sharp image can be obtained when the relative speed between the developer layer and the electrostatic latent image retaining layer is zero. It is widely known that the magnetic brush is not allowed to manifest its sweeping effect (the effect of the magnetic brush in improving the sharpness of the image by sweeping the surface of the latent image and gathering toner particles toward the image part) unless the difference of speed mentioned above is imparted. The same phenomenon as this takes place in the present invention.

Now, the charging device, the electrostatic latent image forming device, the transfer device, the cleaning device, the discharging device, the charging and cleaning device, the electrostatic latent image forming and cleaning device, the developing and cleaning device, and the discharging and cleaning device, and the discharging and cleaning device will be described below.

These devices are characterized by being provided with an elastic electroconductive roller which comprises an elastic roller base and a flexible electroconductive layer formed on the periphery of the roller base.

These devices are desired to fulfill the following conditions.

1. Material (1) For the cleaning device and a combination device fulfilling the function of a cleaning device:

The material for the surface of the elastic electroconductive roller is desired to be chargeable to a polarity opposite to that of the toner. It is particularly desired to be separated far from the material of the toner in the triboelectric series.

In the case of the cleaning device, when it is used for electrically cleaning the electrostatic latent image retaining layer for removal of residual toner from the layer, it is incapable of effecting the cleaning in the Presence of a toner not charged normally, viz, the so-called reversed-polarity toner or an uncharged toner. When the elastic electroconductive roller contemplated by the present invention is used, the residual toner can be normally charged and the cleaning can be carried out because this elastic electroconductive roller is adapted to be rubbed against the electrostatic latent image and consequently enabled to exert a voltage on the layer.

(2) For the transfer device:

To fit the transfer device, the roller base is made of a foaming soft material, particularly a soft polyurethane foam possessing a rigidity (to be determined in accordance with Japanese Industrial Standard (JIS) K-6401; the detail of which will be described afterward) of no more than 100 kgf.

2. Magnitude of electric resistance of electroconductive layer:

(1) For the charging device, the electrostatic latent image forming device, the transfer device, the cleaning device, the discharging device, and a combination device fulfilling the function of such device:

The magnitude of the electric resistance of the electroconductive layer is desired to be in the range of $10^6$ to $10^{12}\Omega$. cm.

These devices are caused to contact the electrostatic latent image retaining layer and, at the same time, apply a voltage to the elastic electroconductive roller. These devices, except for the transfer device, are desired to produce a relative speed and rub against the electrostatic latent image retaining layer. If the magnitude of electric resistance is less than $10^6\Omega$. cm, there ensues a disadvantage that the electrostatic latent image retaining layer suffers from discharge breakdown or decline of potential due to bias leak.

The transfer device, like any of the other devices, is desired to fulfill the conditions mentioned above because the electrostatic latent image retaining layer and the elastic electroconductive roller sometimes come into mutual contact, while at the other times they are separated from each other by a transfer material (paper, for example) to be inserted therebetween.

If the magnitude of electric resistance exceeds $10^{12}\Omega$. cm, the charging device is virtually incapable of effecting the charging, the discharging device is incapable of providing the expected discharging, the transfer device and the cleaning device fail to acquire sufficient potential and suffer from diminished efficiency.

When the electrostatic latent image retaining layer is electrically strong and quite free from fault, use of a conductor layer possessing a magnitude of electric resistance less than $10^6\Omega$. cm is tolerated. It is also desirable to have a protective resistor disposed between the power source and the elastic electroconductive roller.

3. Width of contact with electrostatic latent image retaining layer:

(1) For the charging device, the electrostatic latent image forming device, the cleaning device, the discharging device and combination devices thereof:

The width of contact between the electrostatic latent image retaining layer and the elastic electroconductive roller is desired to be in the range of 0.3 to 8.0 mm.

If the width of contact is less than 0.3 mm, there arises a disadvantage that the contact induces uneven charging, uneven discharging, and insufficient cleaning. Conversely, if this width exceeds 8.0 mm, the torque of rotation of the elastic electroconductive roller increases to an extent undesirable from the practical point of view.

4. Peripheral speed of rotation:

(1) For the charging device, the electrostatic latent image forming device, the discharging device, and combination devices thereof:

The peripheral speed of rotation of the elastic electroconductive roller is desired to be higher than that of the electrostatic latent image retaining layer.

Indeed relatively uniform charging is attained even when the peripheral speed of rotation is lower than that of the electrostatic latent image retaining layer. The uniformity of charging, however, increases in proportion as the rotational speed of the elastic electronconductive roller increases above the peripheral speed of rotation of the electrostatic latent image retaining layer. Thus, it is desirable to set the peripheral speed of rotation of the elastic electroconductive roller at a level higher than that of the electrostatic latent image retaining layer. This difference is desired to be no less than 30 mm/s.

Optionally, the elastic electroconductive roller and the electrostatic latent image retaining layer may be rotated in mutually opposite directions so as to impart a desired difference of peripheral speed.

(2) For the cleaning device and a combination device fulfilling the function thereof:

The peripheral speed of rotation of the elastic electroconductive roller is desired to be higher than that of the electrostatic latent image retaining layer. The difference of peripheral speed is desired to be no less than 40 mm/s.

As described above, the cleaning device is affected by the polarity of charging of the toner. If no difference of peripheral speed exists between the electrostatic latent image retaining layer and the elastic electroconductive roller, the uncharged toner and the reverse-polarity toner cannot be easily charged normally. In the case of the cleaning device, since the electrostatic latent image retaining layer is in a charged state before the discharging and the charging occurs in an unsteady manner, the difference of peripheral speed is desired to be no less than 40 mm/s. (Generally, the electrostatic latent image retaining layer before the charging process has a potential approximately closely to 0 V, indicating that it is in an uncharged state).

Optionally, they may be rotated in opposite directions to impart a desired difference of peripheral speed.

5. Surface:

(1) For the charging device, the electrostatic latent image forming device, the discharging device, and combination devices thereof:

The surface roughness of the elastic electroconductive roller is desired to be no more than 6 μmRz (average roughness of point 10 by JIS scale). If the surface roughness exceed this level, there arises a disadvantage that the roller produces uneven charging. The average value of pitch of concaves and convexes in the surface is desired to be no more than 10 μm.

6. Contact pressure of transfer material:

(1) For the transfer device:

The pressure of contact between the transfer material and the toner image formed on the image carrier is desired to be no more than 300 g/cm$^2$.

Now, the elastic electroconductive roller to be used in each of the devices of the present invention will be described below.

FIG. 5 is a partially cutaway perspective view schematically illustrating the construction of an elastic electroconductive roller 21. The elastic electroconductive roller 21 comprises a metallic shaft 9, a roller base 23, and a conductive layer 25 tightly superposed sequentially outwardly in the order mentioned.

In one example of the elastic electroconductive roller, the roller base is what is obtained by adhesion of a soft polyurethane foam, rubber sponge, or polyurethane rubber containing 30 to 100 cells/25 mm, and the conductor layer is what is obtained by coating the outer surface of a seamless tube of polyester, polyethylene, or polyethylene terephthalate with a polyester resin vested with electroconductivity, by having electroconductive carbon dispersed therein, what is obtained by having electroconductive carbon dispersed in the aforementioned seamless tube, or what is obtained by coating the outer surface of the seamless tube with a vacuum deposited layer of an aluminum or a metallic plating layer.

The elastic electroconductive roller can be obtained by inserting the roller base in the seamless tube. In this case, when the roller base to be used possesses a high surface friction coefficient and it has an outside diameter equal to or larger than the inside diameter of the seamless tube, the elastic electroconductive roller 27 can be produced easily without requiring use of any adhesive agent in the interface. When a thermally shrinking tube having an inside diameter larger than the outside diameter of the roller base is used, it can be caused easily by a heat treatment to adhere fast to the surface of the roller base. Thus, the elastic electroconductive roller can be obtained more easily.

The electroconductive roller 27 constructed as described above is illustrated in FIG. 6.

In this elastic electroconductive roller 27, the roller base 20 is a polyurethane type micro-cell foam layer (produced by Inoue MTP K.K. and marketed under trademark designation of "ENDUR") and a conductor layer 31 is a seamless polyester tube 35 having a thickness of 200 μm and coated with an electroconductive polyester 33 film 100 μm in thickness.

The conductor layer 31 is formed by immersing a seamless polyester tube 35 in a solution composed of polyester resin, electroconductive carbon, and a solvent.

The seamless polyester tube 35 has an inside diameter of 20 mm. By having a roller base 29 of an outside diameter of 20.5 mm inserted into the seamless polyester tube, the elastic electroconductive roller 37 is produced.

When the roller base is made of a very soft material such as soft polyurethane foam or when the seamless tube and the roller base are used under conditions harsh to the mutual slip between them, it is desirable to join them through the medium of an adhesive agent. Their union can be effectively achieved by applying a thermally fusible adhesive agent to the inner surface of the seamless tube and the outer surface of the roller base, allowing the applied layers of the adhesive agent to solidify, then inserting the rubber base into the seamless tube, and thereafter giving the resultant composite a heat treatment.

An elastic electroconductive roller 37 constructed as described above is illustrated in FIG. 7.

The elastic electroconductive roller 37 is obtained by fastening the conductive layer 31 to the peripheral surface of a roller base 39 through the agency of an adhesive agent 41. The roller base 39 is made of electroconductive silicone rubber and the conductor layer 31 is made of the same material as the elastic electroconductive roller 27.

The elastic electroconductive roller 37 is obtained by applying electroconductive adhesive agent 41 on the roller base 39, solidifying the applied layer of the adhesive agent, extrusion molding the conductor layer 31 on the solidified adhesive agent, and subsequently fusing the conductor layer 31 and the adhesive agent 41 by a heat treatment. It is otherwise obtained by forming the conductor layer 31 by extrusion molding, for example, inserting the roller base 39 inside the conductor layer 31, and joining them through the medium of the electroconductive adhesive agent 41.

The elastic electroconductive roller contemplated by this invention may be produced by coating the aforementioned foam with an electroconductive liquid plastic or emulsion paste through immersion, or by plating the foam with an electroconductive material. The foam used in this case may possess a compact texture but must not deprive the elastic electroconductive roller of its elasticity as a whole. At least the surface of the foam must possess electroconductivity and is desired, when permissible, to have electrical continuity to the shaft.

This elastic electroconductive roller is produced by preparing a foam, stripping the foam of cell membranes as with a solvent, and subsequently subjecting the denuded foam to a treatment for impartation of electroconductivity. The elastic electroconductive roller as produced has an irregular surface. It can be used for the cleaning device. For the other devices, however, it cannot be used because it has the possibility of imparting the quality of images to be obtained. For the elastic electroconductive roller to be effectively used for the other devices, it must have the surface thereof smoothened prior to use.

The smoothening of the surface is attained, for example, by coating the foam surface with an elastomer and subjecting the coated foam to a treatment for impartation of electroconductivity, by coating the foam surface with an electroconductive elastomer, by subjecting the foam to a treatment for impartation of electroconductivity and coating the resultant foam with an electroconductive elastomer, or by preparing a foam of electroconductive material, coating the foam with an electroconductive elastomer, and further coating the surface of the applied layer of the electroconductive elastomer with an elastomer (elastic high molecular material). Otherwise, the smoothening of the surface may be attained by placing the foam on a heated plate and melting the surface thereof with the heat and allowing the molten surface to smoothen owing to intimate contact with the flat surface of the hot plate or by rolling the foam on a heated plate and allowing the surface of the foam to melt and smoothen in the same manner as described above. It is permissible to attain the smoothening of the surface by coating the foam with an elastomer and subsequently grinding the applied layer of the elastomer.

In yet another construction, the elastic electroconductive roller has at least on the peripheral surface thereof a conductor layer formed mainly of polyurethane resin and exhibiting an electric resistance of no more than $10^{12}\Omega$. cm and, on the inside of the conductor layer, an elastic roller base made of oilproof rubber possessing a rigidity of no more than 40 degrees, preferably no more than 35 degrees, as measured with a hardness meter, Type A, specified in Japanese Industrial Standard (JIS) K6301 and an electric resistance of no more than $10^{12}\Omega$. cm.

As the oilproof rubber mentioned above, NBR (butadieneacrylonitrifile rubber) or Neoprene (chloroprene rubber) is suitably used. This rubber inherently possesses an electric resistance in the neighborhood of $10^{10}\Omega$. cm and, therefore, can be used in its unmodified form. Optionally, this rubber may have the electric resistance further lowered by incorporation therein of such an electroconductivity-imparting agent as electroconductive carbon.

An elastic electroconductive roller 43 constructed as described above is illustrated in FIG. 8.

In elastic electroconductive roller 43, a roller base 45 has an outside diameter of 20.0 mm and is made of NBR rubber and a conductive layer 47 is made of polyurethane resin having a fine electroconductive carbon powder dispersed therein.

The conductive layer 47 is formed as applied on the surface of NBR rubber by the following procedure. A proprietary product of Nippon-Miractran K.K. marketed under product code of "DH20Z313" is used as the electroconductive polyurethane coating material. It is mixed in an equivalent weight with a diluting solvent prepared by mixing methylethyl ketone (MEK) and tetrahydrofuran (THF) in a ratio of 1:1. The diluted coating material consequently obtained is thoroughly stirred and then applied by the dipping method on the surface of the NBR rubber cleaned in advance with a solvent. The lateral faces at the terminals of the roller base 45 of NBR rubber may be also coated with the aforementioned coating material.

On the surface of the conductor layer of a seamless tube, a resistor layer may be superposed for the prevention of a bias leak. The term "bias leak" as used herein refers to the following phenomenon.

When part of the sensitive member is chipped by some cause or other, an electric current flows between the conductor layer on the surface of the elastic electroconductive roller and the sensitive material base. This electric current is curbed to a low level by the protective resistor. Once the electric current is suffered to flow, if only feebly, it gives rise to a potential difference between the opposite terminals of the protective resistor and compels the potential of the conductor layer to equal or approximate to the grounding potential. This phenomenon is called a "bias leak". In the case of the reversal development, the bias leak produces conspicuous white streaks on a solid image and seriously impairs the quality of the image.

When the resistor layer is superposed on the surface of the conductive layer, however, the bias leak is prevented from conspicuously affecting the image for the following reason.

When the electric resistance offered by the resistor layer exceeds $10^{12}\Omega$. cm, for example, the bias leak is not allowed to occur even if the sensitive material base is exposed. When the electric resistance is on the order of $10^{8}\Omega$. cm, the electric current flows in the direction of thickness of the resistor layer and possibly entails the bias leak. Even then, this bias leak is not allowed to lower the overall potential of the resistor layer because the resistor layer offers electric resistance in the direction of the surface. There is the possibility that white dots of the same surface area as those encountered by the sensitive material will appear in the solid part of the image. The possibility of white streaks appearing in the other part of the image, however, is precluded. As described above, the resistor layer brings about an effect of precluding the occurrence of conspicuous defects in the formed image.

The magnitude of the electric resistance of the resistor layer by nature is to be determined in close connection with that of the protective resistor. Generally, it is fixed at a level higher than that of the conductor layer, preferably above, $10^{7}\Omega$. cm. To manifest the effect of a developing electrode, the resistor layer is desired to be formed in a thickness of no more than 0.5 mm.

Further, the metallic shaft is enable to supply bias by using a seamless tube solely of a layer of electroconductive resin and forming the roller base with an elastic conductor. In this particular construction, the blade is not always required to be a conductor. Thus, the freedom in the selection of the material for the blade is notably broadened. This construction permits a more reliable supply of electricity than the construction in which the electricity is supplied from the blade to the conductor layer through the medium of a toner layer.

In this case, the act of joining the seamless tube and the roller base with adhesive agent is effective in preventing the tube from slipping. This union is desired to be effected by the use of an electroconductive adhesive agent. Of course, the occurrence of bias leak can be precluded by having the resistor layer superposed on the surface of the electroconductive tube.

The prevention of bias leak and the production of images of high quality can be ensured by keeping the magnitude of electric resistance of the roller base $10^{6}\Omega$. cm and adopting a seamless tube possessing a higher magnitude of electric resistance.

An elastic electroconductive roller 49 capable of precluding the bias leak is polyester superposed in a thickness of 0.5 mm on the surface of the conductor layer 25. The magnitude of electric resistance on the resistor layer 51 is $10^{7}\Omega$. cm, a level high enough to prevent the formed image from being impaired in quality by bias leak.

The resistor layer 51 is provided at the opposite terminals thereof severally with parts for exposing the conductor layer 25, so that the supply of developing bias to the conductor layer 25 is accomplished owing to the contact between these parts with the blade.

The various devices of the present invention using this elastic electroconductive roller manifest a lasting ability to produce images of high quality owing to the following features.

1. Since the elastic electroconductive roller has no seam on the surface thereof, it is allowed to fulfill charging and other functions with uniformity.

2. Since the elastic electroconductive roller and the electroelastic latent image retaining layer are so adapted as to effect mutual contact and friction, there can be imparted a difference of peripheral speed between them. This fact brings about the following effects.

(1) The charging and discharging are carried out evenly.

(2) The charging, discharging, and cleaning can be thoroughly effected.

(3) The toner can be charged even normally. The charging, when necessary, may be effected to the reversed polarity.

(4) The developing device is adapted for the toner to be supplied in an optimal amount to the electrostatic latent image retaining layer. Thus, a highly desirable image is obtained which comprises a solid image of high and uniform density, a sharp linear image, and a background free from fogging.

3. In the elastic electroconductive roller, the roller base and the conductor layer are separated from each other and are independently vested with the functions of elasticity and electroconductivity. Thus, the freedom in the selection of materials therefor is notably broadened. The elastic electroconductive roller, therefore, can be produced less expensively than the roller-like electroconductive brush.

The conductive layer is not always required to possess suppleness but is only required to possess flexibility.

The conductive layer, therefore, can be formed in a varying manner indicated below, as occasion demands.

(1) Since use of an electroconductive polyester film suffices for the conductive layer, a material required to refrain from chemically reacting with the toner can be selected very easily.

(2) A material capable of preventing exudation of a plasticizer contained in the rubber can be selected.

(3) A material capable of being charged to a polarity opposite to that of the charging of the toner enables the toner to be normally charged by friction. The charging may be effected, when necessary, to the reversed polarity.

(4) A material whose surface has a small friction coefficient enables desired sliding friction to be easily effected and allows a difference of peripheral speed to be easily imparted.

Moreover, since the roller base is not always required to possess electroconductivity, a foamed article such as soft polyurethane foam or rubber sponge can be used as the material therefor. The elastic conductor roller using the roller base of such a material enjoys very high suppleness. As a result, a large nip width can be secured between the elastic electroconductive roller and the electrostatic latent image retaining layer to ensure more uniform charging, discharging, transfer, cleaning, etc.

When the elastic electroconductive roller is so constructed to have at least on the peripheral surface thereof a conductor layer using as a main component a polyurethane resin and exhibiting an electric resistance of no more than $10^{10}\Omega$. cm, and on the inside of the conductor layer a roller base made of an oilproof rubber possessing a rigidity of no more than 40 degrees as measured with a hardness meter, Type A, specified in JIS K6301 and an electric resistance of no more than $10^{10}\Omega$. cm, it enjoys a lasting ability to produce image of high quality as shown below.

(1) The oilproof rubber such as NBR or Neoprene possesses a low electric resistance in the neighborhood of $10^{10}\Omega$. cm as compared with other species of rubber material. When the roller base made of this oilproof rubber is interposed between the metallic core and the conductor layer, the elastic conductor roller is enabled to effect supply of bias. When the oilproof rubber requires to incorporate therein an electroconductive filler for the purpose of lowering its inherent electric resistance, the amount of the filler to be used is smaller than that necessary in the case of other species of rubber material.

(2) Generally, the rubber or sponge which has its electric resistance lowered by dispersion therein of electroconductive carbon lacks suppleness and suffers from heaving permanent compressive strain. The oilproof rubber such as NBR or Neoprene either finds no use for the aforementioned treatment for impartation of electroconductivity or attains desired reduction of electric resistance by incorporation of only a small amount of an electroconductive filler. When the rubber base is made of this oilproof rubber, therefore, the elastic electroconductive roller using the roller base enjoys very satisfactory suppleness and a high degree of freedom from deformation.

The otherwise possible production of an image lacking uniformity of density due to the deformation of the elastic electroconductive roller occurs only with difficulty, even if the elastic electroconductive roller is deformed or deprived of concentricity by enough to absorb such variation. Thus, the elastic electroconductive roller permits production of a transfer device or charging device possessing a lasting ability to produce images of high uniformity.

(3) Since the roller base is formed of the oilproof rubber, the surface of the elastic electroconductive roller cannot be corroded by the polyurethane to be applied thereon. Further, since fast adhesion is obtained with the polyurethane type resin, such drawbacks as exfoliation of the conductor layer and deformation of the elastic electroconductive roller can never take place even after a protracted use.

(4) The polyurethane resin preeminently excels the other resins in physical and mechanical strengths and hardly sustains wear or injury even under harsh working conditions. Further, by incorporation of a fine electroconductive carbon powder capable of lowering the electric resistance or addition of such a polarization inhibitor as dye, the toner particles can be easily prevented from acquiring triboelectricity.

(5) The coating or film of the polyurethane resin possesses the elasticity peculiar to rubber and, therefore, exhibits an excellent ability to succumb to deformation, flexure, elongation, etc. and does not impair the elasticity of the oilproof rubber.

As described above, the devices contemplated by the present invention are allowed to take full advantage of the highly durable and inexpensive elastic electroconductive roller which suffers from only slight degradation of ability even after protracted use, curbs the occurrence of uneven fulfillment of functions, and refrains from injuring the electrostatic latent image retaining layer. These devices possess a lasting ability to produce images of high quality.

DETAILED DESCRIPTION OF THE PREFERRED EMBODIMENT

Figure 1:
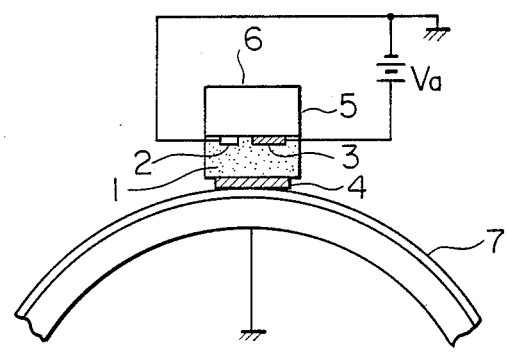
FIG. 1 is an explanatory diagram illustrating the conventional chargeless recording system.
Figure 2:
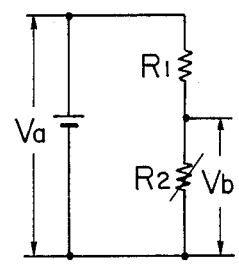
FIG. 2 is a diagram illustrating an equivalent circuit of the conventional chargeless recording head.
Figure 3:
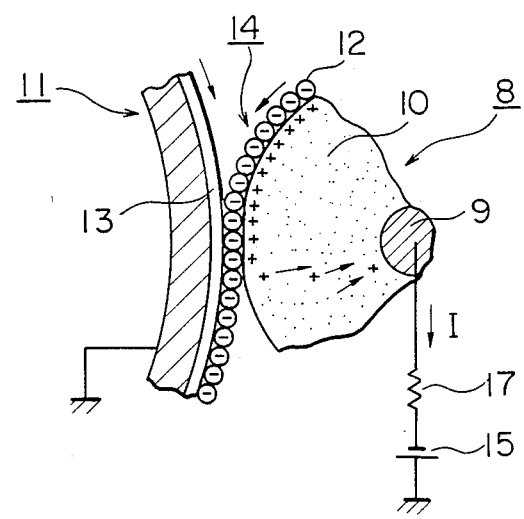
FIG. 3 is an explanatory diagram illustrating the operation of a developing device.
Figure 4:
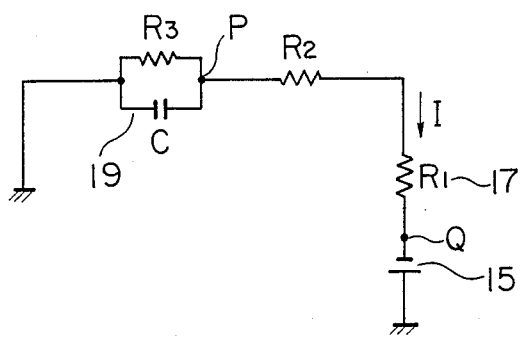
FIG. 4 is a diagram illustrating an equivalent circuit of the developing device.
Figure 5:
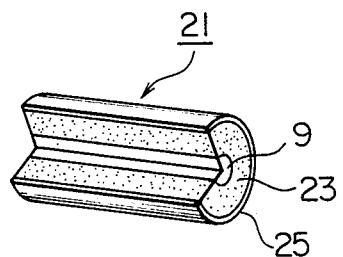
FIG. 5 is a partially cutaway cross sectional view illustrating an elastic electroconductive roller.
Figure 6:
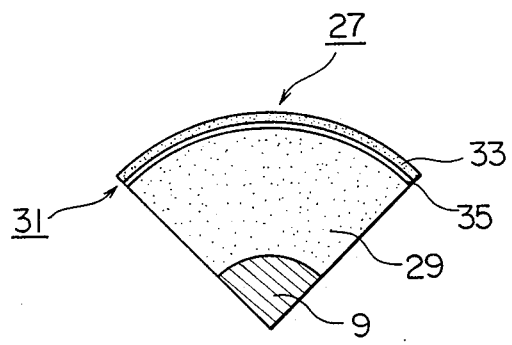
FIG. 6 to FIG. 9 are partial cross sectional views illustrating embodiments of the elastic electroconductive roller.
Figure 7:
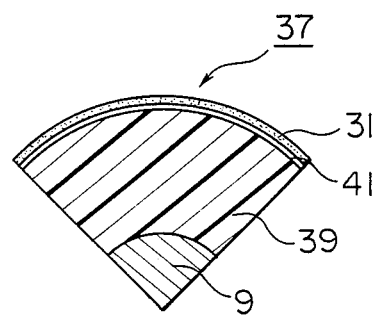
Figure 8:
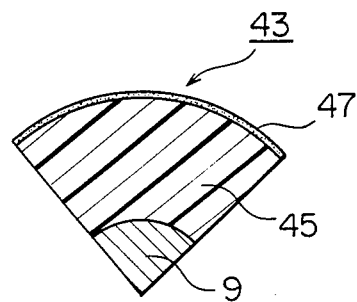
Figure 9:
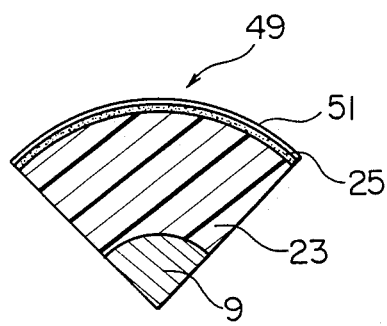
Figure 10:
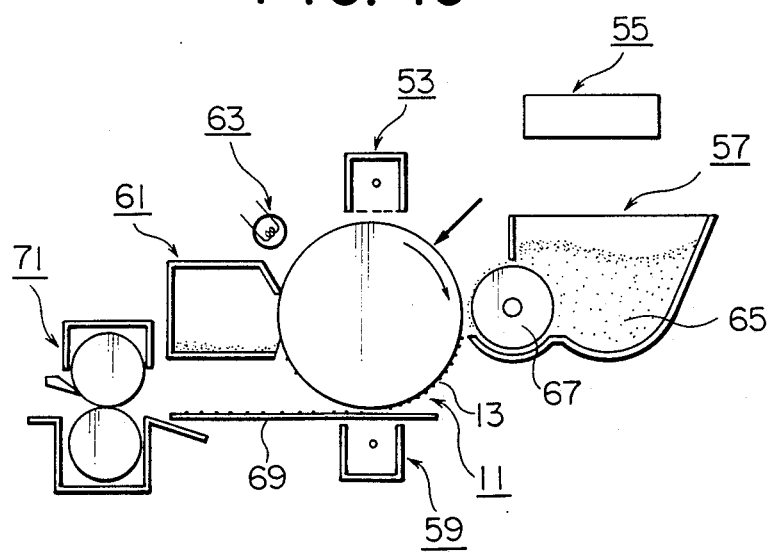
FIG. 10 is a cross sectional view illustrating an essential part of a general electrophotographic apparatus.

FIG. 10 is a diagram illustrating a general electrophotographic apparatus. Around the periphery of the electrostatic latent image retaining roll 11 are disposed a charging device 53, an exposure device 55, a developing device 57, a transfer device 59, a cleaning device 61, and a discharging device. The electrostatic latent image retaining roll 11 is covered on the front surface thereof with the electrostatic latent image retaining layer 13. The developing device 57 is provided with a developing roller 67 and adapted to accommodate therein a toner 65. Through the operations of uniform charging by the developing device 53, exposure of image to light by the exposure device 55, and development of the developing device 57, an image developed with the toner is formed on the electrostatic latent image retaining roll 11. This developed image is transferred onto a transfer material (recording paper) 69 by the transfer device 59. The developed image on the transfer material 69 is fixed by a fixing device 71. In the meantime, the electrostatic latent image retaining roll 11 relieved of the developed image is cleaned by the cleaning device 61 stripped of residual electric charge by the discharged device 63, and put to use again for the formation of a developed image.

The devices of this invention are useful for the process described above. They possess functions fit for a plurality of processes and can be used in an apparatus adapted to fulfill the plurality of processes practically at the same time. They may be able to share the elastic electroconductive roller which is a key part for the processes involved.

(EXAMPLE 1)

Charging device

Figure 11:
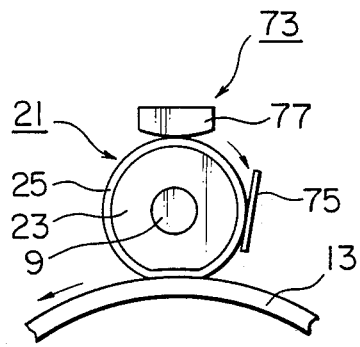
FIG. 11 is a cross sectional view illustrating an essential part of one embodiment of the charging device.

One example of the charging device of the present invention will be described. FIG. 11 is a cross sectional view illustrating an essential part of the charging device 73.

The metallic shaft 9 had an outside diameter of 8 mm. The roller base 23 was made of the aforementioned polyurethane type micro-cell foam 20.5 mm in outside diameter. The conductor layer 25 was a seamless tube. The elastic electroconductive roller 31 had a volume resistance of $10^7 \Omega$. cm.

An electrode member 75 made of a phosphor bronze sheet 0.2 mm in thickness was kept pressed against the surface of the conductor layer 25, so that a prescribed voltage was applied to the conductor layer 25 by power source means (not shown) through the medium of this electrode member 75. A cleaning member 77 adapted to sweep the residual toner particles adhering to the surface of the conductor layer 25 was kept pressed against the surface mentioned above. The cleaning member 77 was formed of a sheet of felt 10 mm in width and 3 mm in thickness. The metallic shaft 9 was rotatably supported by a stationary member (not shown). Trial electric charging was carried out by using the charging device 73 and the electrostatic latent image retaining layer (member to be charged) 13 made of an organic photoconductive material, with the contact width with the elastic electroconductive roller 21 fixed at 1 mm.

Figure 13:
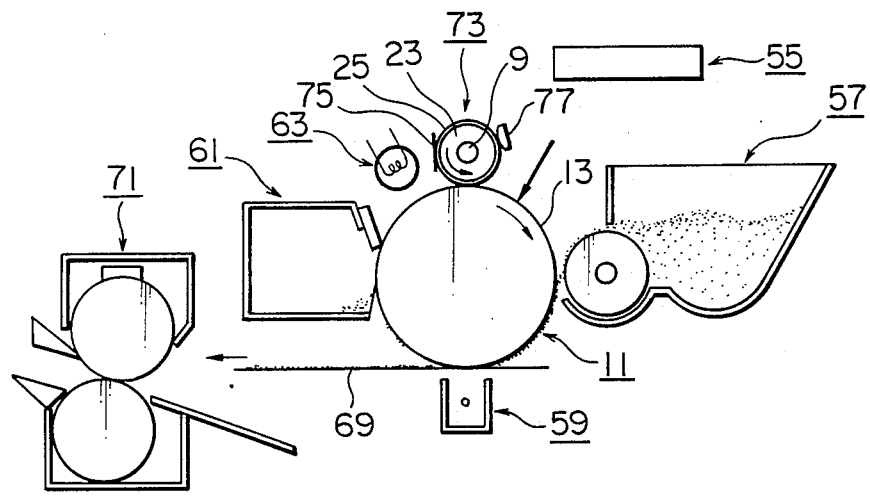
FIG. 13 is a cross sectional view illustrating an essential part of one embodiment of the charging device used in the electrophotographic apparatus.

When a voltage was applied to the electrode member 75 with the peripheral speed of rotation of the elastic electroconductive roller 21 fixed at 80 mm/s and that of the electrostatic latent image retaining layer 13 at 47 mm/s, the electrostatic latent image retaining layer 13 exhibited a charging characteristic as shown in FIG. 13. The surface potential of the electrostatic latent image retaining layer 13 showed a small dispersion within 20 V.

When the device was operated with the contact between the elastic electroconductive roller 21 and the electrostatic latent image retaining layer 13 kept below 0.3 mm, it showed a charging dispersion of no less than 50 V, a level undesirable from the practical point of view.

When the direction of rotation of the electrostatic latent image retaining layer 13 was reversed and the direction of sliding contact thereof with the elastic electroconductive roller 21 was consequently reversed, the operation gave the same results as described above. For desirable results of the operation, the difference of peripheral speed was required to exceed 30 mm/s. With a smaller difference of peripheral speed, though the charging was attained, the surface potential of the electrostatic potential image retaining layer 13 was unduly low. When the difference of peripheral speed decreased to 0 mm/s, the ratio of decrease of the surface potential was about 30%. Though the magnitude of this decrease varied with the material of the conductor layer 25 and that of the electrostatic latent image retaining layer 13, it became constant when the difference of peripheral speed exceeded 30 mm/s.

(EXAMPLE 2)

Charging device

The elastic electroconductive roller 21 was produced by forming the roller base 23 with electroconductive silicone rubber possessing a rigidity of 35 degrees and a volume resistance of $10^4 \Omega$. cm and the conductor layer 25 with an electroconductive polyester resin layer possessing a volume resistance of $10^7 \Omega$. cm.

The charging device 73 of the present example used this elastic electroconductive roller 21.

Trial charging was carried out by applying a bias voltage to this elastic electroconductive roller 21 from the metallic shaft 9. The result were similar to those of Example 1. During a protracted use, the charging device exhibited a highly satisfactory charging characteristic without entailing fast adhesion of toner to the surface of the elastic electroconductive roller 21.

The charging effected with the aforementioned elastic electroconductive produced results similar to those of Example 1 using the elastic electroconductive roller 21 whose conductor layer 27 possessed an electric resistance of $10^7 \Omega$. cm. The device exhibited a satisfactory charging characteristic even during a protracted use.

When the elastic electroconductive roller 21 whose conductor layer 25 possessed an electric resistance of $10^2 \Omega$. cm was used, the surface potential of the electrostatic latent image retaining layer 13 was practically equal to the potential applied to the conductor layer 25. In this case, the electrostatic latent image retaining layer 13 was hardly susceptible of dielectric breakdown and was free from defects such as pinholes.

The electrophotographic apparatus using the charging device 73 is illustrated in FIG. 13.

(EXAMPLE 3)

Developing device

Figure 14:
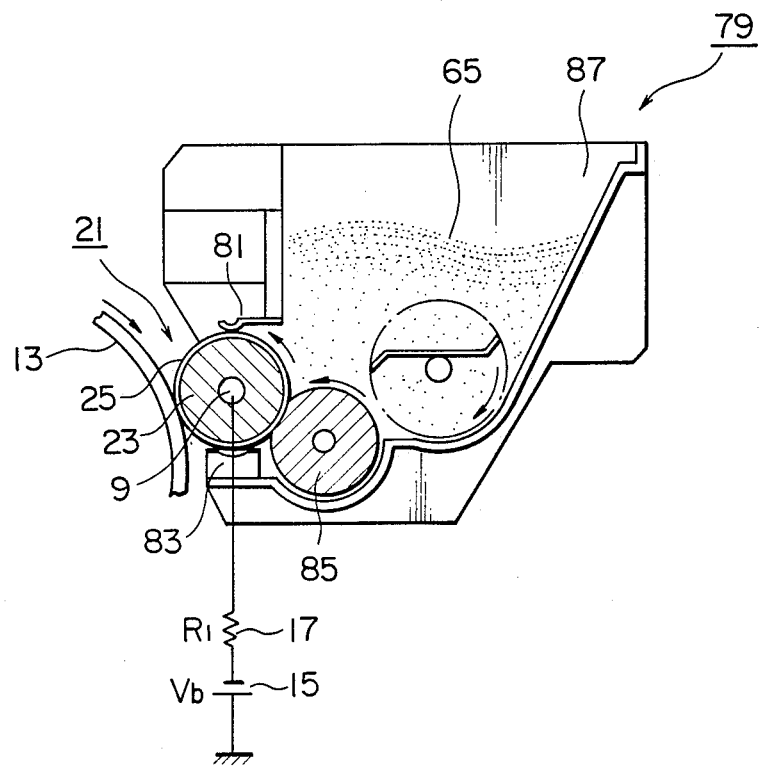
FIG. 14 is a cross sectional view illustrating an essential part of one embodiment of the developing device.

An example of the developing device of this invention will be described. FIG. 14 is a cross sectional view illustrating an essential part of a developing device 79.

As a developing roller (toner carrier), the elastic electroconductive roller 21 was used. The elastic electroconductive roller 21 had an elastomer layer 23 and a conductor layer 25 sequentially superposed outwardly on the periphery of a metallic shaft 9 having an outside diameter of 8 mm. It was adapted to rotate counterclockwise. The elastomer layer 23 was made of NBR rubber possessing a rigidity of 28 to 38 degrees as measured with a hardness meter, Type A, specified in JIS K 6301 and an outside diameter of 20 mm. The NBR rubber used an oil incapable of migration in the place of the conventional plasticizer so as to refrain from inducing reaction with the toner 65 or the electrostatic latent image retaining layer 13.

Figure 15:
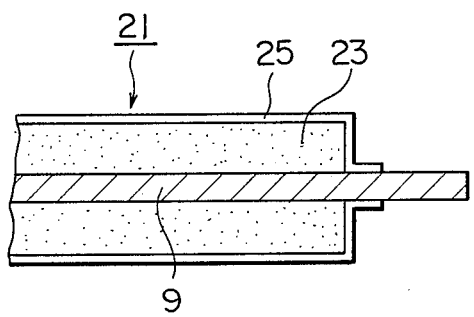
FIG. 15 is a partial cross sectional view of a developing roller.

The conductor layer 25 was produced by applying on the surface of the elastic electrostatic layer 23 and the surface of part of the metallic shaft 9 as illustrated in FIG. 15 by the dipping method or spray method a coating material prepared by dispersing a fine electroconductive carbon powder in a polyurethane elastomer and consequently endowed with a varying level of electroconductivity, i.e. $1 \times 10^3 \Omega$. cm, $6 \times 10^6 \Omega$. cm. The thickness of the conductor layer 25 was in the range of 50 to 200 μm.

A toner layer forming member 81 was made of a phosphor bronze sheet 0.2 mm in thickness with the leading end thereof curved semicircularly with a radius of curvature of 2 mm. Part of the curved end of this toner layer forming member 81 was kept pressed against the surface of the elastic electroconductive roller 21 with a prescribed pressure. A recovery blade 83 for preventing the toner feeding roller 85, and the electrostatic latent image retaining layer 13 were kept pressed against the surface of the elastic electroconductive roller 21.

The recovery blade 83 is capable of preventing the one-component non-magnetic toner 65 stored in a toner container 87 from spilling out the developing device and, at the same time, causing the residual toner adhering to the surface of the elastic electroconductive roller 21 to be recovered inside the toner container 87 without being split en route. In the present example, a polyurethane rubber in sheet 0.5 mm in thickness superposed fast on a sponge was used as the recovery blade 83. This polyurethane rubber sheet was kept gently pressed against the elastic electroconductive roller 21 except for the surface (main surface) in the terminal part as illustrated in the diagram. The toner feeding roller 85 was formed of soft polyurethane foam possessing a density of 75 kg/m$^3$ and foam cell number of 80/25 mm. The contact depth of the toner feeding roller 85 relative to the elastic electroconductive roller 21 was fixed at 0.5 mm and the peripheral speed thereof at one half that of the elastic electroconductive roller 21. When the toner layer forming member 81 was pressed against the elastic electroconductive roller under a linear pressure of 80 g/cm and the elastic electroconductive roller 21 was rotated at a peripheral speed of 94 mm/sec, a uniform thin toner layer was formed at a rate of 0.5 mg/cm$^2$ on the surface of the elastic electroconductive roller 21. When this thin toner layer was aerially aspirated and introduced into a Faraday cage, the toner in the Faraday cage was found to possess a potential of −9.0 μC/g. The toner used herein was a negatively charging type insulating black toner obtained by dispersing carbon black in a polyester type resin. The charging of the toner was mainly effected by friction with the toner layer forming member 81.

In the present example, the aforementioned developing device was used in the so-called laser beam printer adapted to form a latent image on the surface of an organic photoconductive material by negatively charging the surface and exposing the surface to light through a given image, and then converting the latent image into a visible image by treating the latent image by the reversal development method.

First, of the three species of electroconductive coating material mentioned above, that of an electric resistance of $1 \times 10^3 \Omega$. cm was applied in a pattern shown in FIG. 15 on the elastic electroconductive roller 21. The image developed with this roller 21 were analyzed to find the relation between various parameters and the produced images. Here, the magnitude of electric resistance, R, between the surface of the elastic electroconductive roller 21 and the developing bias voltage applying means 15 will be defined. The elastic electroconductive roller 21 and an aluminum cylinder 30 mm in outside diameter are parallelly placed and pressed against each other so as to produce a contact width of 3 mm, a potential difference of 10 V is established between the aluminum cylinder and the metallic shaft of the elastic electroconductive roller 21, and the magnitude of the electric current, I [Ω], which consequently flows between them is measured. In accordance with the following formula, the magnitude of electric resistance between the metallic shaft 9 of the elastic electroconductive roller 21 and the surface is calculated.

$$R_2 = 10/I \ [\Omega]$$

Then the protective resistor 17 whose electric resistance is $R_1$ is used. Then, the magnitude of electric resistance, R, mentioned above is defined by the following expression.

$$R = R_1 + R_2 \ [\Omega]$$

The function of the magnitude of protective resistance, $R_1$, is as follows. The desirability of the results of operation, more often than not, increases in proportion as the magnitude of electric resistance, $R_2$, of the elastic electroconductive roller 21 decreases. When the operation of development is repeated with an electrophotographic apparatus having the elastic electroconductive roller 21 of $R_2 = 10^3 \Omega$ connected to the developing bias power source 15 without using the protective resistor 17, it sometime occurs that black spots are formed in the background of a produced image or white streaks appear in the solid part of the image. This drawback is ascribable to the socalled bias leak. Owing to the pinholes which are suffered to occur during the course of application of the electrostatic latent image retaining layer 13 and the defects which are inflicted subsequently as by mechanical impacts on the electrostatic latent image retaining layer 13, a high current flows from the elastic electroconductive roller 21 to the electrostatic latent image retaining roll 11 and, with the Joule heat consequently generated, inflicts burns on the electrostatic latent image retaining layer 13. These burns manifest themselves as the black spots mentioned above. When the protective resistor 17 whose resistance falls in the range of $1 \times 10^5$ to $1 \times 10^8 \Omega$, preferably $1 \times 10^6$ to $1 \times 10^7 \Omega$, is used in the aforementioned electrophotographic apparatus, since the leak current is curbed, the electrostatic latent image retaining layer 13 is not suffered to retain burns. Thus, the protective resistor 17 is highly effective in precluding the occurrence of black spots and white streaks. Of course, the apparatus has no use for the protective resistor 17 when the magnitude of resistance, $R_2$, of the elastic electroconductive roller 21 is set in the range of $1 \times 10^5$ to $1 \times 10^8 \Omega$, preferably $1 \times 10^6$ to $1 \times 10^7 \Omega$. It is not easy for the magnitude of resistance of the elastic electroconductive roller, subsequently to the step of application, to be confined in such a low range as mentioned above. From the practical point of view, therefore, it is more economical to lower the magnitude of resistance of the elastic electroconductive roller 21 to the fullest possible extent and use the protective resistor 17.

Figure 16:
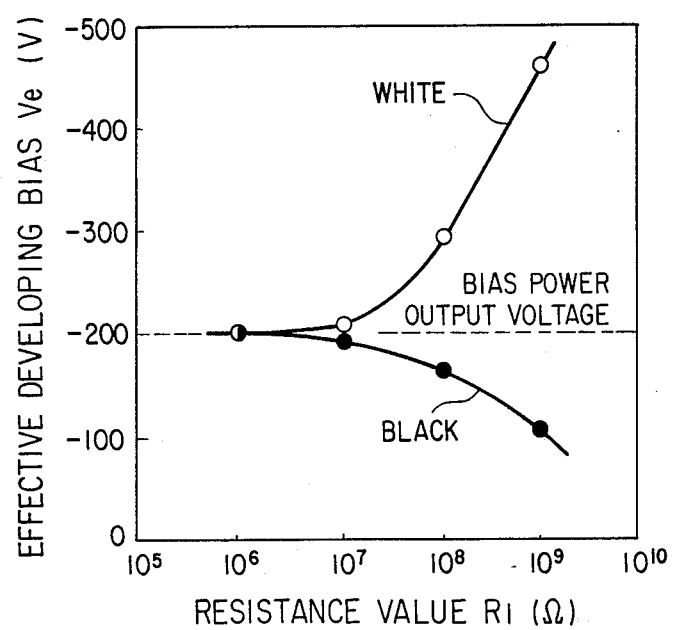
FIG. 16 is a diagram illustrating an effect of the developing device.

The magnitude of resistance, $R_2$, of the elastic electroconductive roller produced from a coating material possessing an electric resistance of $1 \times 10^3 \Omega$. cm was found by test to be $7 \times 10^3 \Omega$. When reversal development was carried out by incorporating in the apparatus the protective resistor 17 having a magnitude of resistance of $1 \times 10^7 \Omega$ and setting the output voltage, $V_b$, of the developing bias power source 15 at −200 V, the background potential, $V_o$, of the latent image at −500 V, the potential, $V_L$, of the image part (exposed part) of the latent image at −50 V, and the contact width between the electrostatic latent image retaining roll 11 and the elastic electroconductive roller 21 at 2.0 mm. There was obtained a sharp developed image enjoying uniform and high density and showing no sign of background fogging. Then, to find the relation between the magnitude of resistance, R, and the quality of image, the magnitude of resistance, $R_1$, of the protective resistor was varied and the variation in the effective developing bias voltage, $V_e$, or the potential on the surface of the elastic electroconductive roller 21 was measured. In consideration of the actual relation of $R_1 \gg R_2$, it is permissible to measure the potential at the elastic electroconductive roller side terminal of the protective resistor 17 and report the result of this measurement as the effective developing bias voltage, $V_e$. The results are shown in FIG. 16. The curve of black circle 4s representing the effective developing bias voltage, $V_e$, obtained during the wholly black solid development, indicates that this voltage was −200 V, a value absolutely equal to the output voltage of the power source, when the magnitude of resistance, R ($R_1$), was $1 \times 10^6$ and fell to −80 V when the magnitude of resistance was $1 \times 10^9 \Omega$. In the case of the wholly white background, the electrostatic latent image retaining layer 13 was relieved of the surface potential as expected and the flow of electric current in a direction opposite to that existing during the wholly black solid development was observed. The value of $V_e$ was −200 V at $1 \times 10^6 \Omega$ and −450 V at $1 \times 10^9 \Omega$. The review of the test results with respect to the relation with the image quality reveals that the image density was no more than 1.20 when $|V_e|$ was lower than 100 V and a conspicuous background fogging appeared when $|V_e|$ was higher than 400 V. A safe conclusion, therefore, is that the amplitude of variation in the effective developing bias due to the developing current should be no more than 100 V, preferably no more than 50 V, in the case of the black solid development or no more than 200 V, preferably no more than 100 V, in the case of the wholly white background.

Three elastic electroconductive rollers 21 were produced respectively from the three species of coating material possessing $1\times10^3\Omega$. cm, $6\times10^6\Omega$. cm, and $3\times10^8\Omega$. cm of electroconductivity and were tested to find the relation between the magnitude of resistance, R, and the quality of image. By the method described above, the magnitudes of resistance of these elastic electroconductive rollers 21 were found to be $7\times10^3\Omega$, $2\times10^7\Omega$, and $1\times10^{10}\Omega$ respectively. When the development was carried out without the use of the protective resistor 17, the rollers of $7\times10^3\Omega$ and $2\times10^7\Omega$ produced images of fine quality the roller of $1\times10^{10}\Omega$ produced an image having a low density of 1.1 in the wholly black solid part and showing a conspicuous sign of background fogging in the wholly white background. These results agree with the test results shown in FIG. 16. A safe conclusion, therefore, is that varying the magnitude of resistance, $R_2$, of the elastic electroconductive roller 21 is equivalent to varying the magnitude of protective resistance, $R_1$.

Then, the impacts of other factors (v, l, m, and q) than the magnitude of resistance, were studied. In the aforementioned experiment using the conditions of v=94 mm/sec, l=200 mm, m=0.5 mg/cm$^2$, and q=−9.0 uC/g, first the available length, l, was changed to 20 mm, a value 1/10 the former value, to check the impact on the quality of image. When the wholly black solid development was carried out under the conditions of $R_1=10^9\Omega$ and $R_2=7~10^3\Omega$, it was found that the effective developing bias, Ve, was −188 V and the decline of potential by the resistance, R, was 12 V. These values are equal to exactly 1/10 of the values found at l=200 mm, indicating that the developing current decreased exactly to 1/10 the original level. The produced image was fine in quality, showing no discernible sign of background fogging, decline of density, or decline of resolving power. These results support a conclusion that the quality of image is not exclusively fixed by the magnitude of resistance, R, of the elastic electroconductive roller 21 but affected by the various factors which go to determine the magnitude of developing current, the value of |q|vlmR in the wholly black solid development should be no more than 100 V, and the value of IR in the wholly white background development should be no more than 200 V.

The same experiment repeated under varied conditions of V=40 mm/sec, m=1.2 mg/cm$^2$, and q=−21.0 μC/g yielded data supporting a conclusion that the operation is performed satisfactorily when the essential conditions of this invention, i.e. |q|VlmR=<100 and IR=<200, are fulfilled.

(EXAMPLE 4)

Developing device

Figure 17:
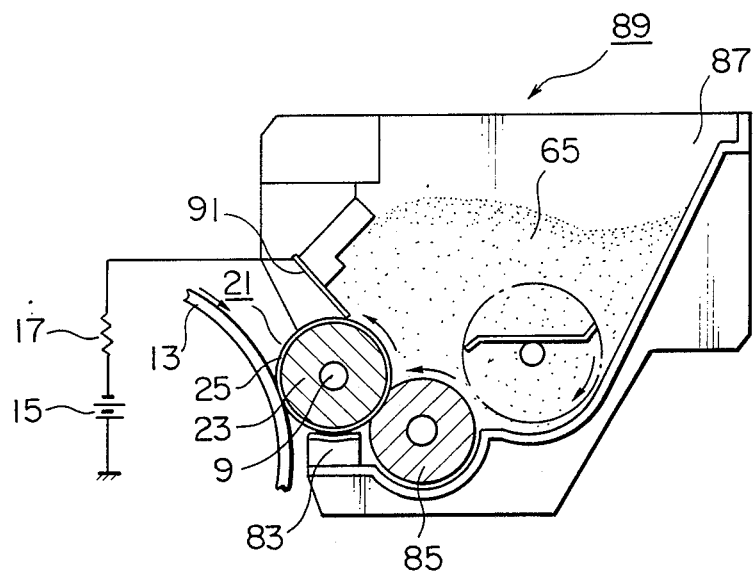
FIG. 17 is a cross sectional view illustrating an essential part of another embodiment of the developing device.

Now, yet another example of the developing device of this invention will be described. FIG. 17 is a cross sectional view illustrating an essential part of a developing device 89.

The elastic electroconductive roller 21 used as a developing roller (toner carrier) for this developing device 89 is formed of rubber sponge and the conductor layer 25 was formed of a resin layer having an electroconductive carbon powder dispersed therein. The resistance of the conductor layer 25 was 10$^2\Omega$. cm.

The elastic electroconductive roller 21 was rotated counterclockwise. A toner layer forming blade 91 was made of a phosphor bronze sheet 0.2 mm in thickness and adapted with the free end thereof kept pressed gently against the elastic electroconductive roller 21. A direct-current power source 15 was connected to this blade 91 through the medium of the protective resistor 17 of 10 M $\Omega$ so as to permit supply of a bias voltage to the conductor layer 25 of the elastic electroconductive roller 21. By the method indicated in Example 3, the magnitude of resistance between the direct-current power source 15 and the surface of the elastic electroconductive roller 21 was found to be $1.0\times10^7$.

In addition to the blade 91 mentioned above, the seal member 83 for preventing toner spilling, the toner feeding roller 85, and the electrostatic latent image retaining layer 13 were kept in contact with the surface of the elastic electroconductive roller 21.

The seal member 83 discharges the part of preventing the toner 65 held in the toner container 87 from spilling outside and, at the same time, causing the toner remaining after the development on the surface of the elastic electroconductive roller 21 to be recovered in the toner container 87 without being spilled en route. The seal member used in this case was obtained by superposing a polyurethane rubber sheet 0.5 mm in thickness fast on the sponge.

The toner feeding roller 85 was formed of a soft polyurethane foam. At the point of contact with the elastic conductive roller 21, this toner feeding roller 85 was rotated in a direction opposite to that of the elastic electroconductive roller 21. When the one-component nonmagnetic toner 65 is used as in the present example, the force of effecting the adhesion of the toner particles to the surface of the elastic electroconductive roller 21 is limited solely to the enantiomorphic force, and any remotely acting force corresponding to the magnetic force acting upon the magnetic toner is absent. Immediately after quantitative consumption of the toner 65 for the solid image development, therefore, the supply of the toner 65 to the elastic electroconductive roller 21 is not sufficient, and the images to be subsequently formed suffer at times from so-called "ghost." The toner feeding roller 85 is provided on the surface thereof with numerous foam cells, which lend themselves to ensuring supply of a large volume of the toner 65 to the surface of the elastic electroconductive roller 21. Thus, the surface behavior of the toner feeding roller 85 is highly effective in eliminating the aforementioned phenomenon of "ghost."

In the present example, the aforementioned developing device 89 is used in the so-called laser beam printer, which effects the formation of a latent image by projecting a laser beam on the surface of the electrostatic latent image retaining layer 13. Of course, this developing device can be used in the so called copying apparatus whose operating principle resides in focussing the reflected light from the original on the electrostatic latent image retaining layer 13.

Although the electrostatic latent image retaining layer 13 in this case of comprised a negatively charging organic photoconductive material, it may be formed of a selenium type or amorphous silicon type material.

When the electrostatic latent image retaining layer 13, uniformly charged to a surface potential of −550 V by the well-known corona charging, was exposed to a laser beam, there was obtained an electrostatic latent image having a potential of −50 V in the image part (exposed part) and a potential of −550 V in the non-image part. Thereafter, the aforementioned developing device 89 was operated to effect reversal development.

The contact width between the elastic electroconductive roller 21 and the electrostatic latent image retaining layer 13 was about 3 mm and the peripheral speed of rotation of the elastic electroconductive roller 21 was 188 mm/sec (4.0 times the peripheral speed of the electrostatic latent image retaining layer 13).

The available length of the elastic electroconductive roller 21 was 20 cm.

The toner container 87 held therein a black one component non-magnetic toner 65 of the negatively charging polyester resin. By the rotation of the elastic electroconductive roller 21, a uniform thin layer of the toner was formed on the surface of the elastic electroconductive roller 21. While the toner particles were in the process of passing under the pressure of the blade 91, they were negatively charged by the friction between the blade 91 and the surface of the elastic electroconductive roller 21. When the linear pressure of the blade 91 on the elastic electroconductive roller 21, namely the quotient of (total pressure)/(length of free end of blade), was fixed at 20 g/cm, the amount of the toner deposited per unit area of the surface of the elastic electroconductive roller 21 was 0.5 mg/cm$^2$ and the magnitude of toner charging was −8 $\mu$C/g. In this case, the amount of the toner deposited was determined by pneumatically collecting the toner adhering to the surface of the elastic electroconductive roller 21 in a Faraday cage, measuring the magnitude of potential, Q, and the amount of collected toner, M, and calculating the quotient Q/M. The electric resistance between the blade 91 and the conductor layer 25 on the surface of the elastic electroconductive roller 21 was found to be in the neighborhood of $1 \times 10^3 \Omega$ while the elastic electroconductive roller 21 was in rotation, and while it was at rest. This fact implies that the electric continuity between the edge of the blade 91 and the conductor layer 25 on the surface of the elastic electroconductive roller 21 was comparatively satisfactory in spite of the intervention of the thin toner layer between the blade 91 and the elastic electrocconductive roller 21, and the application of a voltage to the blade 91 brought about application of a practically equal elastic electroconductive bias to the elastic electroconductive roller 21.

In the present example, $|q|m = <100/\sqrt{IR}$ was obtained.

When the reversal development of the latent image was carried out under the aforementioned conditions by applying a developing bias of −250 V to the blade 91, there was obtained a sharp developed image having an image density of no less than 1.3 and showing absolutely no sign of fogging.

Then, the following various experiments were carried out for the purpose of finding the optimal ranges for the developing conditions.

First, the relation between the peripheral speed of the elastic electroconductive roller 21 and the quality of image was calculated by varying the peripheral speed of the elastic electroconductive roller 21 within the range of 16 to 423 mm/sec, namely the range of $\frac{1}{3}$ times to 9 times the peripheral speed of the electrostatic latent image retaining layer 13. When the peripheral speed was below 1.0 times the peripheral speed of the electrostatic latent image retaining layer 13, the amount of the toner supplied to the latent image was not sufficient and the produced image was deficient in density because the speed of the electrostatic latent image retaining roller 21 was lower than that of the elastic electroconductive roller 13.

When the peripheral speed was within the range of 1.0 to 1.5 times, the uniformity and sharpness of the image were not fully improved and the produced image was deficient in quality because the difference of speed between the elastic electroconductive roller 21 and the electrostatic latent image retaining layer 13 was unduly small. Further, the density of the image was rather on the insufficient side. When the peripheral speed exceeded 7 times, the formed image was sufficient in density but showed signs of fogging and smearing. These defects are thought to have resulted from the scattering of toner by the centrifugal force generated by the rotation of the elastic electroconductive roller 21 and the excessive supply of toner to the electrostatic latent image retaining layer 13. When the peripheral speed was in the range of 1.5 to 7.0 times, there were obtained images of very high quality.

The contact width between the elastic electroconductive roller 21 and the electrostatic latent image retaining layer 13 was varied in the range of 0 to 12 mm. When the contact width was in the range of 0 to 0.3 mm, the images formed were devoid of uniformity and deficient in sharpness. When the contact width exceeded 6 mm, the formed images showed signs of fogging and blurring. Images of high quality were obtained when the peripheral speed was in the range of 0.3 to 6 mm. Where the outside diameters of the elastic electroconductive roller 21 and the electrostatic latent image retaining layer 13 were respectively 20 mm and 60 mm, the proper range of contact depth analogous to the contact width was 0.1 to 2.0 mm.

A total of four species of elastic electroconductive roller 21 were trially manufactured, three species using roller bases 23 having 12, 120, and 220 as magnitudes of rigidity and one species made of silicone rubber. The images produced with the four species of elastic electroconductive roller 21 were evaluated for change of quality, with the contact pressure between the elastic electroconductive roller 21 and the electrostatic latent image retaining layer 13 as a parameter. In this case, the contact pressure was calculated by the division of (total pressure of roller on drum)/(contact area). Though the desirability of the development increased with the decreasing magnitude of the contact pressure, the images formed showed no sign of defect when the contact pressure was no more than 1 kg/cm$^2$. When the contact pressure exceeded 1 kg/cm$^2$, the formed images showed a conspicuous sign of fogging and blurring and their image parts occasionally betrayed lack of uniformity of density.

The surface roughness of the elastic electroconductive roller 21 as a parameter was studied in relation to the quality of image. The conductor layer 25 of the elastic electroconductive roller 21 was obtained by applying to the elastic electroconductive roller 21 a coating of a polyester resin having electroconductive carbon dispersed therein. The surface roughness of the coating thus formed was 0.1 $\mu$m. A total of five species of elastic electroconductive roller 21 were trially manufactured, four species having surfaces treated by sand blasting to 0.5 $\mu$m, 3.0 $\mu$m, 5.2 $\mu$m, and 9.3 $\mu$m as magnitudes of roughness and one species of elastic electroconductive roller 21 which had not undergone this treatment.

The results of test were studied by comparison. The elastic electroconductive rollers 21 with 5.2 μm and 9.3 μm of surface roughness produced images lacking sharpness and tending to show a sign of fogging. Those with no more than 3.0 μm of surface roughness produced images invariably tolerable in sharpness, density, and freedom from fogging. This behavior of surface roughness may be logically explained by a supposition that the toner layer grew in thickness and the uncharged toner increased in amount when the surface roughness gained in magnitude and the frictional force generated between the toner and the surface of the elastic electroconductive roller 21 was so large as to restrict the rolling motion and sliding motion of the toner particles at the position of development. The surface roughness of the elastic electroconductive roller 21 is desired to be no more than 3.0 μm.

Figure 18:
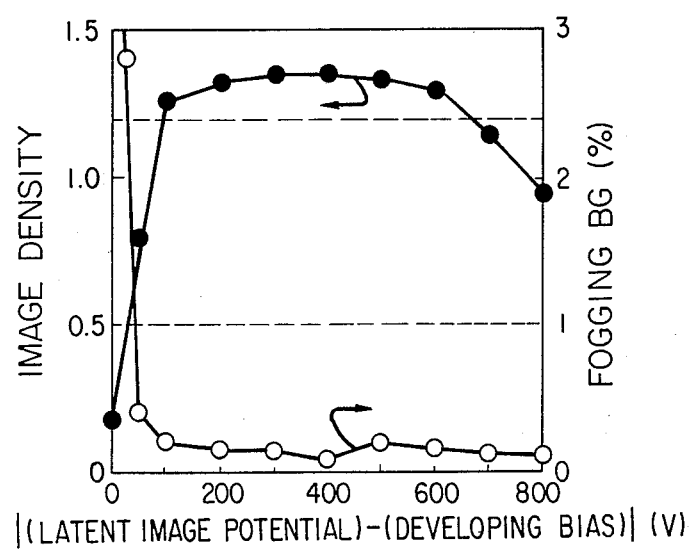
FIG. 18 is a characteristic diagram illustrating the results of an experiment by the use of the developing device.

FIG. 18 is a diagram illustrating characteristic curves representing the results of determination of the developing characteristic of the present example, with the potential difference between the surface of the elastic electroconductive roller 31 and the electrostatic latent image as a parameter. As one of the salient characteristics of this invention, the fact that the development is attained satisfactorily even when the potential difference between the electrostatic latent image retaining layer 13 and the elastic electroconductive roller 21 is small because the developing electrode approximates very closely to the electrostatic latent image, namely the fact that the development is effected at a low potential, may be mentioned. The test results of FIG. 18 evince this characteristic very well. It is clearly noted that the development proceeds satisfactorily to produce images no less than 1.2 in density when the absolute value of the potential difference between the surface of the elasticelectroconuctive roller 21 and the image part of the electrostatic latent image is no less than 100 V and no more than 600 V. The term "density of image" as used herein refers to the numerical value obtained by transferring the toner image formed on the electrostatic latent image retaining layer 13 onto a plain paper by the well-known corona transfer method, thermally fixing the transferred toner image on the plain paper, and measuring the optical density of the fixed toner image. It is also noted from the results of measurement of fogging indicated in the same diagram that the percentage of fogging is kept below 1% when the absolute value of the potential difference between the non-image part of the electroconductive roller 21 is no less than 50 V. The term "fogging (BG)" as used in the diagram is defined by the formula:

$$BG = R_0 - R$$

wherein $R_0$ stands for the optical reflectance of the plain paper before the transfer of the toner image and R for the optical reflectance of the non-image part of the transferred and fixed image. This value of fogging was used as the criterion for the evaluation of fogging, on the assumption that any value of BG of no more than 1% represents practical absence of fogging.

The preceding examples have been described as effecting the reversal development owing to the combination of the negatively charging type electrostatic latent image retaining layer 13 and the elgatively charging type toner. This invention is not limited to this particular combination.

As the toner layer forming means, the elastic metallic sheet has been mentioned as an example. The thin toner layer may otherwise be obtained satisfactorily by pressing a rigid member of metal or resin against the surface of the elastic electroconductive roller 21.

The roller base 23 of the elastic electroconductive roller 21 may be made of a foam material such as sponge or of a rubbery material such as silicone rubber or Neoprene rubber.

The developing bias, in the foregoing examples, is applied to the elastic electroconductive roller 21 through the medium of the metallic blade 91. Alternately, this application of the developing bias may be accomplished by imparting electroconductivity to the roller base 23 of the elastic electroconductive roller 21 and allowing the supply of electricity to the surface of the elastic electroconductive roller 21 to take place through the metallic shaft 9 and the roller base 23.

(EXAMPLE 5)

Discharging device

An example of the discharging device of the present invention will be described below.

For diversion of the charging device into the discharging device, if suffices to change the voltage applied to the conductor layer 25 to a potential desired to be released. The construction of the discharging device may be identical with that of the charging device.

A discharging device 93 in the present example is identical with the charging device 73 of Example 1 and Example 2, except that the potential of the conductor layer 25 thereof is changed to the desired level (normally 0 V).

In the present case, when the electrostatic latent image retaining layer 13 was charged to −800 V with a S charger, and then relieved of its potential with the charging device 73 described in Example 1 and Example 2, with various conditions such as the contact width between the electrostatic latent image retaining layer 13 and the elastic electroconductive roller 21, the peripheral speeds thereof, and the magnitude of resistance of the conductor layer 25 equalized to those of the charging device 73, and the conductor layer 25 equalized to those of the charging device 73, and the conductor layer 25 kept in a grounded state, the surface potential of the electrostatic latent image retaining layer 13 after the discharge was invariably in the range of −30 V to −80 V. When the same experiment was repeated, except that the voltage applied to the conductor layer 25 was changed to −200 V, the voltage after the discharging was −200 V and the variation was no more than 20 V. When the experiment was repeated, except that the electrostatic latent image retaining layer 13 was made of a dielectric material such as Mylar in place of a photosensitive material the results of the discharging were substantially the same as those obtained above. The tribo-electricity of the material more or less affected the test results. The discharging was sufficiently attained, however, by curbing the triboelectricity of the material of the conductor layer 25 or by selecting the material itself.

Figure 19:
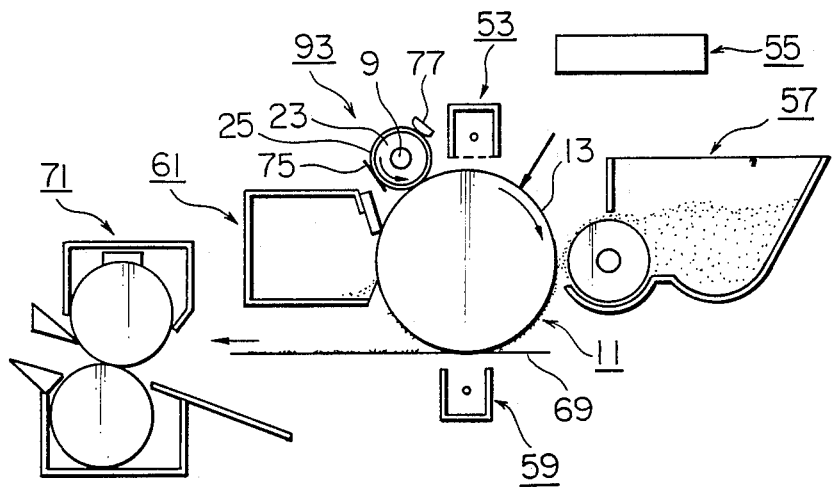
FIG. 19 is a cross sectional view illustrating an essential part of an embodiment of the discharging device used in the electrophotographic apparatus.

An electrophotographic apparatus using the discharging device 93 is illustrated in FIG. 19.

(EXAMPLE 6)

Transfer device

An example of the transfer device of the present invention will be described below.

Figure 20:
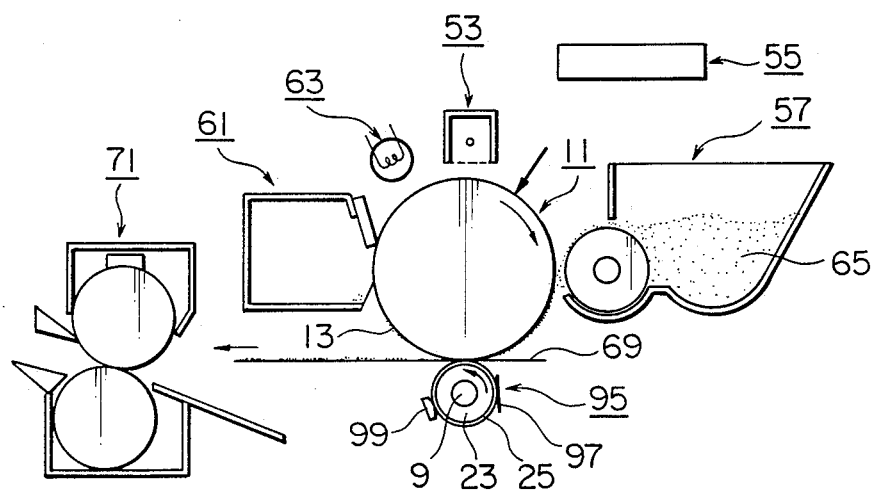
FIG. 20 is a cross sectional view illustrating an essential part of an embodiment of the transfer device used in the electrophotographic apparatus.

FIG. 20 illustrates this transfer device 95 as used in the electrophotographic apparatus. It was provided with the electrostatic latent image retaining roll 11 as an image carrier and was adapted to form a toner image (developed image) on the electrostatic latent image retaining roll 11 and cause this toner image to be transferred onto the transfer material (recording paper) 69 nipped between the elastic electroconductive roller 21 (transfer roller) and the electrostatic latent image retaining roll 11. The electrostatic latent image retaining roll 11 was provided on the surface thereof, for example, with a selenium type photoconductive layer. Owing to the construction described above, the developed image of toner formed on the electrostatic latent image retaining roll 11 through the operations of uniform charging by the charging device 53, exposure to light by the exposure device 55, and development by the developing device 57 accommodating the toner 65 therein was transferred onto the transfer material 69 interposed between the electrostatic latent image retaining roll 11 and the elastic electroconductive roller 21.

Figure 21:
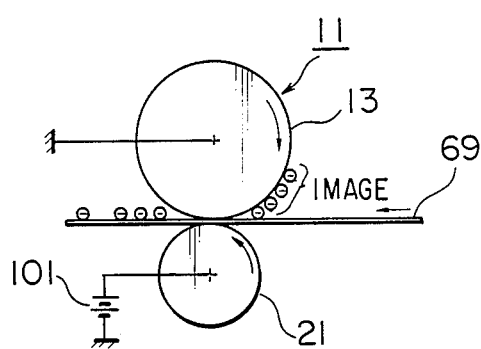
FIG. 21 is a cross sectional view illustrating an operating principle of the transfer device.

FIG. 21 is a diagram illustrating the operating principle of the transfer device in the present example. The electrostatic latent image retaining roll carried on the surface thereof the developed image of toner. The back electrode on the front surface of the electrostatic latent image retaining roll 11 was grounded. The toner forming the developed image was negatively charged. The recording paper 69 was nipped between the elastic electroconductive roller 21 and the electrostatic latent image retaining roll 11. A positive (+) voltage was applied to the conductor layer 25 of the elasticelectroconductive roller 21. When the electrostatic latent image retaining roll 11 and the elastic electroconductive roller 21, held in the state mentioned above, were set to rotation, and the recording paper was conveyed in such a manner as to preclude occurrence of deviation of the recording paper relative to the electrostatic latent image retaining roll 11, the developed image of toner was transferred onto the recording paper 69.

The elastic electroconductive roller 21 to be used in the present example is desired such that the contact pressure thereof exerted on the electrostatic latent image retaining roll 11 is varied only slightly, even when the contact width thereof with the electrostatic latent image retaining roll 11 appreciably varies, and the contact thereof with the electrostatic latent image retaining roll 11 is safely retained, even when the contact pressure is no more than 300 g/cm$^2$.

The elastic electroconductive roller 21 used in the transfer device 95 will be described below with reference to FIG. 20. An electrode member 97 formed of a phosphor bronze sheet was kept pressed against the conductor layer 25 of the elastic electroconductive roller 21 so as to permit application of a prescribed voltage to the electrode member by the power source means (not shown). A cleaning member 99 adapted to sweep the paper powder and the toner adhering to the surface of the conductor layer was kept pressed against the surface of the conductor layer 25.

The cleaning member 99 was formed of felt. The outside diameter of the metallic shaft 9 was 8 mm. The roller base 23 may be made of a soft material such as rubber. In the present example, it was formed of an ester type soft polyurethane foam having an average cell number of 35 per 25 mm and a density of 31 kg/m$^3$. The ester type soft polyurethane foam had an outside diameter of 20.5 mm. A seamless polyester tube having a 20 mm inside diameter was used as the conductor layer 25. The resistivity of the conductor layer 25 was $10^7 \Omega$·cm. The thickness of the conductor layer 25 was 70 μm and that of the base 70 μm.

The transfer device 95 using the elastic electroconductive roller 21 constructed as described above was operated to find the relation between the pressure and the contact width with which the elastic electroconducive roller 21 was pressed against the electrostatic latent image retaining roll 11 through the medium of the recording paper 69. The results of the operation indicate that the pressing force or the linear pressure per unit length in the axial direction of the electrostatic latent image retaining roll 11 increased with the increasing contact width and the pressure per unit area was virtually constant at an extremely low level of about 45 g/cm$^2$ through the entire range of contact width of 3 mm to 8 mm.

In contrast, when the conventional electroconductive rubber roller was used as the transfer roller, the pressure required in producing a contact width of 2 mm was in the range of 500 to 2,000 g/cm$^2$. When another example of the elastic electroconductive roller 21 of this invention was used as the transfer roller, the pressure required in producing a contact width of 2 mm was no more than 300 g/cm$^2$. This sharp contrast may be ascribed to the fundamental fault of the conventional electroconductive rubber roller, i.e. the fact that it is difficult to impart a desired electroconductivity to rubber without a sacrifice of the high flexibility inherent therein. This invention solved this problem by separating the following two functions.

Figure 22:
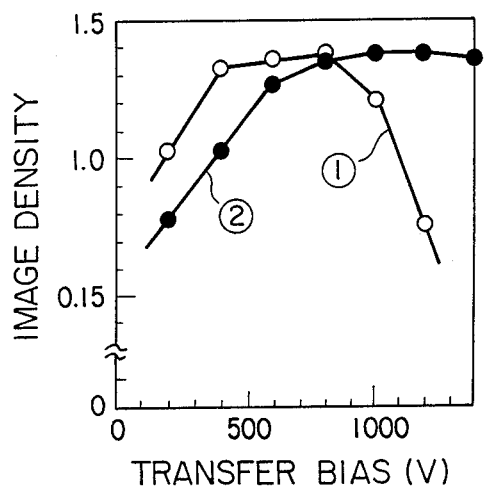
FIG. 22 is a diagram illustrating the transfer characteristic of one embodiment of the transfer device.

A black toner image was transferred onto the transfer paper 69 by the transfer device 95, thermally fixed on the transfer paper, and then tested for density. As the result, there was obtained a transfer characteristic represented by the curve (1) in FIG. 22. The transfer property was highly satisfactory and the aforementioned phenomenon of missing a part of the formed image was not observed at all when the transfer bias voltage was in the range of 400 to 800 V. The transfer efficiency registered a high value of no less than 90% in the range of voltage mentioned above. In the example described above, a selenium type photoconductive drum 60 mm in outside diameter was used as the electrostatic latent image retaining roll 11, with the maximum surface potential at the position of development fixed at +600 V and the peripheral speed of rotation at 100 mm/sec. The outside diameter of the elastic electroconductive roller 21 was 20 mm, the contact width between the electrostatic latent image retaining roll 11 and the transfer material 69 was 3 mm, and the distance between the axis of rotation of the elastic electroconductive roller 21 and the surface of the electrostatic latent image retaining roll 11 was so set that the peripheral speed of rotation of the elastic electroconductive roller 21 relative to the fictitious radius was 100 mm/s.

(EXAMPLE 7)

Transfer device

In the transfer device of this example, the transfer roller comprised the conductor layer 25 of the aforementioned elastic electroconductive roller 21 and a high-resistance layer formed additionally. To be specific, the metallic shaft 9 which had a soft polyurethane foam superposed as the roller base 23 on the periphery thereof was inserted in a polyester seamless tube having the conductor layer 25 disposed in advance on the inner wall thereof. The resistivity of the conductor layer 25 was $10^2 \Omega \cdot cm$. The thickness of the polyester seamless tube was 75 mm. The conductor layer 25 was obtained by forming on the seamless tube a coating of polyester resin having electroconductive carbon dispersed therein. This conductor layer 25 (seamless tube) was formed in a length greater than that of the roller base 23 and was adapted so that a desired voltage would be applied thereto through the medium of the electrode member 97. When the transfer of the toner was performed with the contact width between the elastic electroconductive roller 21 and the electrostatic latent image retaining roll 11 set at 3 mm, and then the thermally fixed image was tested for density, there was obtained a transfer characteristic represented by the curve (2) in FIG. 22.

This curve (2), as compared with the curve (1) obtained with the transfer device 95 described in Example 6, clearly characterizes the fact that the bias voltage must be high to enhance the efficiency of transfer, the decline of density is small on the high potential side, and the transfer characteristic is affected only slightly by the potential condition. Again in this case, the transferred images obtained were satisfactory, showing no missing portion in the central part.

In Example 6 and Example 7, numerous species of soft polyurethane foam possessing varying rigidity were evaluated as the material for the roller base 23 to find the relation between the rigidity and the phenomenon of showing a missing portion in the central part of the image. The results indicate that this phenomenon was liable to occur when the rigidity of the soft polyurethane foam exceeded 100 kgf. In this case, the rigidity of soft polyurethane foam was determined on the basis of the specification of JIS K-6401. Specifically, this determination was made by a procedure comprising the steps of placing a given test piece 50 mm in thickness and about 30 cm in diameter flatly on the stand of a testing machine, measuring the thickness of the test piece under a load of 0.5 kgf, recording the result of the measurement as the initial thickness, then depressing a circular pressure plate into the test piece to 75% of the load, again immediately depressing the circular pressing plate into the test piece to 25% of the initial thickness, and taking the scale reading of the load after 20 seconds following the stop of the depression. The load thus found was reported as the magnitude of rigidity.

Numerous species of electroconductive material were studied as the material for the conductor layer 25. It was found that the conductor layer 25 ceased to function as an electrode and the efficiency of transfer declined when the magnitude of resistance exceeded $10^{12} \Omega \cdot cm$. Particularly in Example 11, when the electrostatic latent image retaining layer 13 of the electrostatic latent image retaining roll 11 sustained such defects as pinholes, discharge of potential occurred between the conductor layer 25 and the electrostatic latent image retaining roll 11 and often entailed a decline of the bias voltage and defective transfer. This fact indicates the desirability of the conductor layer 25 possessing the magnitude of resistance in the range of $10^6 \Omega \cdot cm$ to $10^{12} \Omega \cdot cm$. Of course, the use of a conductor possessing a magnitude of resistance of less than $10^6 \Omega \cdot cm$ as the material for the conductor layer 25 is tolerated when a resistance of the magnitude (for example, $10^5$ to $10^8 \Omega$) enough to curb the aforementioned discharge of potential is inserted between a power source 101 and the conductor layer 25.

When the roller base 23 of the elastic electroconductive roller 21 was formed of NBR rubber, the transfer could be carried out in the same manner as described above. In this case, for the purpose of decreasing the contact pressure as much as possible, minimizing the variation of the contact pressure, and ensuring infallible contact, it was found desirable for the aforementioned rubber to possess a rigidity of no more than 40 degrees as measured with a hardness meter, Type A, specified in JIS K-6301. When the rubber meeting the description given above was used in the elastic electroconductive roller 21 of the construction contemplated by this invention, it sustained only minor permanent stain and withstood a protracted use, though it offered no generous contact width. The contact width was 1.5 mm and the contact pressure was 200 g/cm² when the rigidity of rubber was 35 degrees.

(EXAMPLE 8)

Cleaning device

An example of the cleaning device of this invention will be described below.

Figure 23:
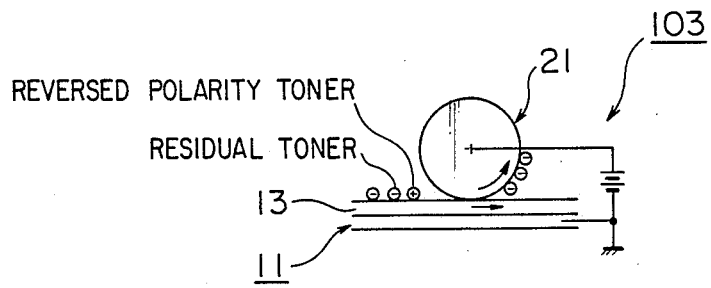
FIG. 23 is a cross sectional view illustrating an operating principle of a cleaning device.

FIG. 23 is a diagram illustrating an operating principle of the cleaning device of the present example. The electrostatic latent image retaining layer 13 electrostatically held on the surface thereof the toner remaining after the previous round of transfer. In the diagram, the polarity of the normally charged toner particle is indicated as "minus" (−) and that of the reversely charged toner particle as "plus" (+).

In the elastic electroconductive roller 21 to be used as a cleaning device 103, the charging polarity of the surface material of the elastic electroconductive roller 21 was desirably opposite to that of the toner. As illustrated in the diagram, a positive (+) voltage was applied. The electrostatic latent image retaining layer 13 retaining the residual toner on the surface thereof moved from left to right as illustrated in the diagram and passed a cleaning device 103. At this time, since the elastic electroconductive roller 21 was rotating at a peripheral speed higher than the speed of the movement of the electrostatic latent image retaining layer 13, the residual toner and the electrostatic latent image retaining layer 13 were rubbed so that the reversely polarized toner was charged to the normal polarity (minus as illustrated in the diagram) and the residual toner was wholly swept electrostatically.

Figure 24:
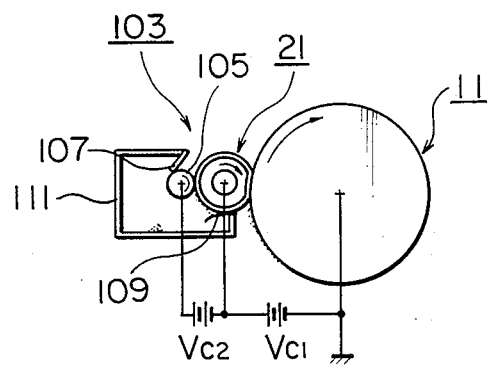
FIG. 24 is a cross sectional view illustrating an essential part of an embodiment of the cleaning device.

FIG. 24 is a diagram illustrating the elastic electroconductive roller 21 used in the cleaning device 103. The electrostatic latent image retaining layer 13 carried on its surface the toner charged to minus (−). The elastic electroconductive roller 21 was held in contact with the electrostatic latent image retaining layer 13. A metallic roller 105 and the elastic electroconductive roller 21 were held in mutual contact and they were both rotated clockwise to be slid on each other. A blade 107 is pressed against the metallic roller 105. A recovery member 109 was made of a soft material such as Mylar and adapted to touch the elastic electroconductive roller 21 gently enough to avoid scrapping off the toner and effect recovery of the toner inside a case 111. In the construction described above, a potential difference was imparted between the rollers as illustrated so that the object adhering to the electrostatic latent image retaining layer 13 was sequentially transferred from the electrostatic latent image retaining layer 13 to the elastic electroconductive roller 21, and from the elastic electroconductive roller 21 to the metallic roller 105, and the object on a metallic roller 123 was scraped off by the blade 107. In this construction, the blade may be formed of a material such as stainless steel which possesses durability and exhibits a low friction coefficient. The cleaning device 103 fulfilled its function satisfactorily without effecting thorough removal of the adhering object from the metallic roller 105, because the object on the elastic electroconductive roller 21 was transferred onto the metallic roller 105. Thus, it sufficed to have the edge of the blade 107 kept in light touch with the metallic roller 105. The metallic roller 104 may be replaced by some other conductive roller. Since the elastic electroconductive roller 21 of this example excelled in durability, a cleaning device 113 could be constructed by causing the blade 107 to be pressed directly against the elastic electroconductive roller 21 and omitting the metallic roller 105 (FIG. 25).

(EXAMPLE 9)

Cleaning device

Figure 25:
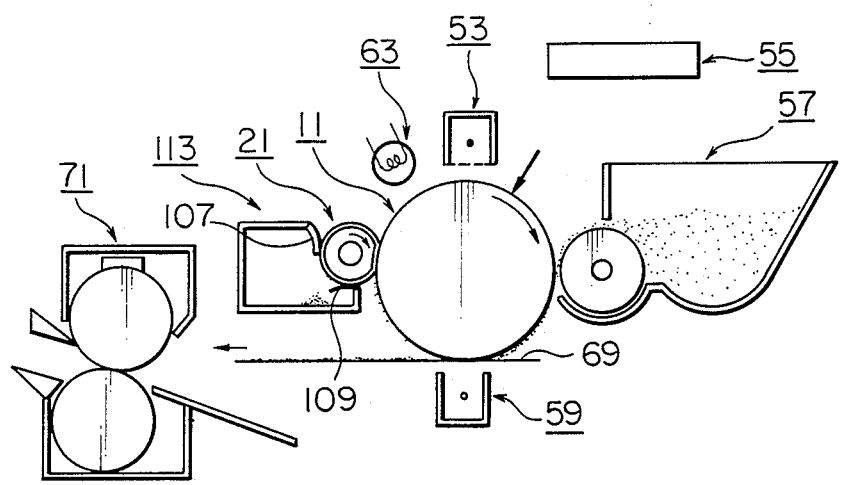
FIG. 25 is a cross sectional view illustrating an essential part of an embodiment of the cleaning device used in the electrophotographic apparatus.

FIG. 25 is a diagram illustrating the cleaning device 113 of this invention used in an electrophotographic apparatus.

In the present example, the aforementioned elastic electroconductive roller 49 was adopted as the elastic electroconductive roller 21. The roller base 23 was made of NBR and the conductor layer 25 was made of an electroconductive polyurethane coating material. The rigidity of the rubber in the roller base 23 was 30 degrees as measured with a hardness meter, Type A, specified in JIS K 6301. The resistivity of the conductor layer 25 was $10^7 \Omega$. cm and the thickness thereof was 50 $\mu$m. The blade 107 was formed of a phosphor bronze sheet 0.2 mm in thickness and adapted to have the edge thereof kept in lightly pressed contact. The pressure of this contact was about 10 g/cm in the longitudinal direction of the blade 107. The electrostatic latent image retaining roll 11 and the elastic electroconductive roller 21 were both rotated clockwise at an equal peripheral speed of 47 mm/s. The voltage was applied through the blade 107 and the magnitude of this voltage was such as to impart a difference from the surface potential of the electrostatic latent image retaining layer 13. The electrostatic latent image retaining layer 13 formed a latent image by exposing to a laser beam an organic photoconductor having the surface thereof negatively charged in advance, produced a developed image by effecting reversal development of the latent image with a negatively charging toner, transferred the developed image onto the recording paper 69 by the operation of the transfer device, and thereafter undersent a cleaning treatment by the operation of the cleaning device 113 of this example. It was found that a potential difference of no lessthan 150 V between the surface of the electrostatic latent image retaining layer 13 after the step of transfer and the roller base 23 sufficed for thorough cleaning.

In the case of the reversely polarized toner, the cleaning device 113 using the aforementioned electroconductive polyurethane coating material in the conductor layer 25 permitted thorough cleaning when the difference of peripheral speed between the electrostatic latent image retaining roll 11 and the elastic electroconductive roller 21 was no less than 30 mm/s. In this case, when the roll 11 and the roller 21 were rotated in opposite directions, the required cleaning was attained with the difference of peripheral speed set above 30 mm/sec. When the toner was intentionally deposited electrostatically on the elastic electroconductive roller 21 with the blade 107 of varying shape and pressure to find the effects of shape and pressure of the blade 107 on the efficiency of cleaning, it was found that thorough removal of the toner (inclusive of the reversely polarized toner) adhering to the electrostatic latent image retaining layer 13 could be attained so long as the amount of the toner deposited on the elastic electroconductive roller 21 was no more than 1 mg/cm$^2$, preferably no more than 0.8 mg/cm$^2$. The thorough cleaning was obtained in spite of variation in the pressure of the blade 107. A wide variation was conceivable as to the manner of holding or pressing the blade 107. As illustrated in FIG. 25, the supporting point of the blade 107 was not always required to fall on the downstream side of the pressing point of the blade relative to the direction of rotation of the elastic electroconductive roller 21. Where the edge was held in pressed contact, the required cleaning was attained even if the supporting point fell on the upstream side. Where a metallic conductor was used, the application of voltage could be obtained through the blade 107 to the conductor layer 25 of the elastic electroconductive roller 21. When the elastic electroconductive roller 21 was adapted so as to permit the application of voltage to the elastic electroconductive roller 21 through the medium of the shaft, the blade made of other material such as polyurethane rubber sufficed. The contact width between the elastic electroconductive roller 21 and the electrostatic latent image retaining layer 13 had to exceed 0.3 mm to ensure thorough cleaning. The resistivity of the conductor layer 25 of the elastic electroconductive roller 21 had to be no more than $10^{12} \Omega$. cm for the purpose of the cleaning. The material for the conductor layer 25 was desired to possess polarity opposite to the charging polarity of the toner. This material was desired to be separated from the material of the toner in the triboelectric series.

(EXAMPLE 10)

Cleaning device

Figure 26:
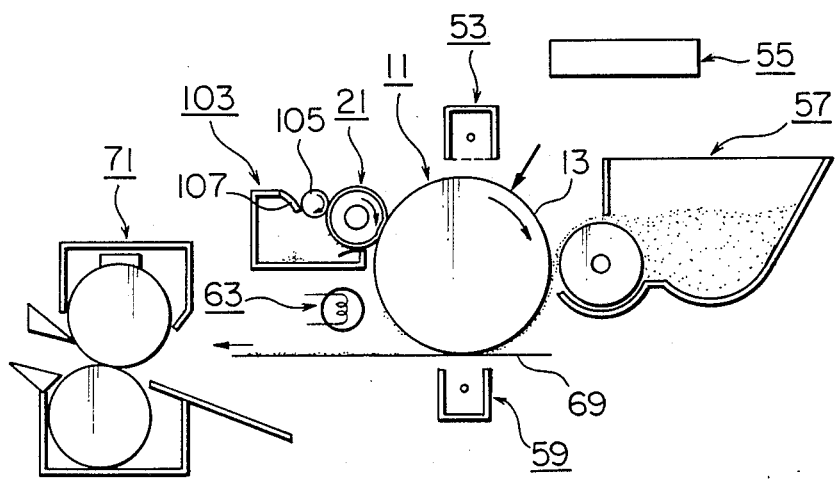
FIG. 26 is a cross sectional view illustrating an essential part of another embodiment of the cleaning device used in the electrophotographic apparatus.

FIG. 26 illustrates an electrophotographic apparatus using the cleaning device 103.

Any of the species of elastic electroconductive roller 21 described above sufficed on condition that the requirements mentioned in Example 9 were satisfied. In the present example, an electroconductive polyester tube was used as the conductor layer 25 and an electroconductive silicone rubber was used as the material for the roller base 25. They were joined fast with the electroconductive adhesive agent 41. The application of voltage to the conductor layer 25 was attained through the medium of the shaft. The stainless steel roller 105 was held in contact with the conductor layer 25 and the stainless steel blade 107 was kept in contact with the stainless steel roller 105. The electrostatic latent image retaining layer 13, the stainless steel roller 105, and the elastic electroconductive roller 21 were adapted to impart required potential difference. Thus, the resistivity of the conductor layer 25 of the elastic electroconductive roller 21 was desired to fall in the range of $10^6$ to $10^{12} \Omega$. cm. In the present example, the operating principle and the construction described in Example 8 and Example 9 sufficed for the purpose of the cleaning. The cleaning aimed at was attained when the potential difference between the electrostatic latent image retaining layer 13 and the elastic electroconductive roller 21 was no less than 200 V, the difference of peripheral speed no less than 30 mm/s, and the contact with no less than 0.3 mm. For thorough transfer of the toner from the elastic electroconductive roller 21 to the stainless steel roller 105 or thorough cleaning of the elastic electroconductive roller 21 was attained when the potential difference between the elastic electroconductive roller 21 and the stainless steel roller 105 was no less than 150 V, the difference of peripheral speed no less than 10 mm/s, and the contact with no less than 0.3 mm. The other conditions on the relation between the blade 107 and the stainless steel roller 105 were the same as those of the preceding example.

In FIG. 26, the discharging device 63 is depicted as used in a step preceding the step using the cleaning device 103. In this arrangement, as compared with the arrangement in which the discharging device was used in the step subsequent to the step using the cleaning device 113, the maximum potential difference between the cleaning device 113 and the elastic electroconductive roller 21 was small and the disturbance causable by a high potential difference of bias leak was not liable to occur because the surface potential of the electrostatic latent image retaining layer 13 was uniform and low.

(EXAMPLE 11)

Charging and cleaning device

An example of the charging and cleaning device of the present invention will be described.

Figure 27:
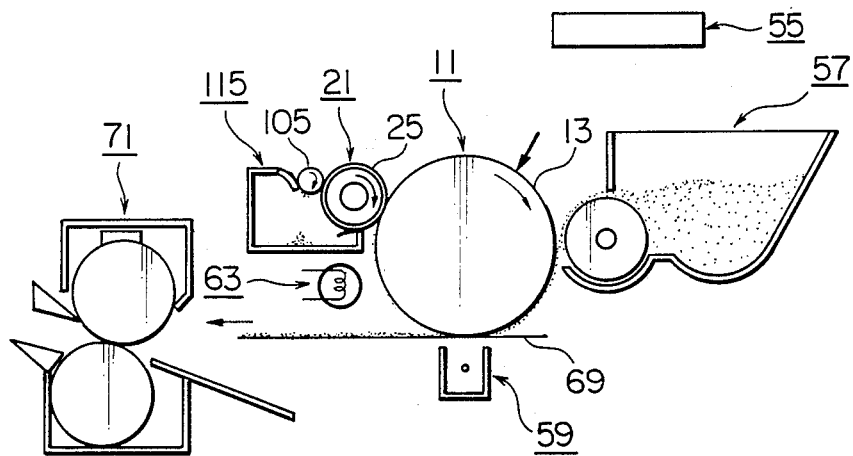
FIG. 27 is a cross sectional view illustrating an essential part of yet another embodiment of the cleaning device used in the electrophotographic apparatus.

FIG. 27 illustrates an example of the charging and cleaning device 115 provided with the elastic electroconductive roller 21. This construction was substantially the same as that of Example 10 described above with reference to FIG. 26. The charging and cleaning device 103 was a combination of the charging device described above with reference to FIGS. 11 to 13 and the cleaning device 103, 113 described above with reference to FIGS. 23 to 26, and adapted to make effective use of common parts of the two devices.

The charging and cleaning device illustrated in FIG. 27 was allowed to perform charging and cleaning operations by application of conditions necessary for cleaning and those necessary for charging. To be specific, these conditions were fulfilled simply by setting voltage applied to the elastic electroconductive roller 21 at a level necessary for the charging. When the electrostatic latent image retaining layer 13 was charged to 500 V, for example, the charging and cleaning could be attained by setting the applied voltage at 800 V and the voltage for application to the stainless steel roller 105 at 905 V. The charging characteristic substantially equal to that illustrated in FIG. 12 was obtained and the cleaning attained by satisfying the conditions for the charging device and the cleaning device.

It was difficult, however, to charge the surface of the electrostatic latent electrostatic latent image retaining layer 13 to plus (+) and give desired cleaning to the toner whose normally charged polarity was plus (+). The difficulty could be overcome by forming the conductor layer 25 of the elastic electroconductive roller 21 with a material capable of charging the toner wholly to minus (−) by friction therewith. Generally, however, the toner is intended to be normally charged. To ensure thorough cleaning, therefore, it was necessary to select elaborately the material for the conductor layer 25 and that for the toner, so that the toner would be normally charged during the process of development and transfer and reversely charged during the process of cleaning. The removal of a charge repressant from the toner, for example, was an effective measure.

(EXAMPLE 12)

Discharging and cleaning device

Figure 12:
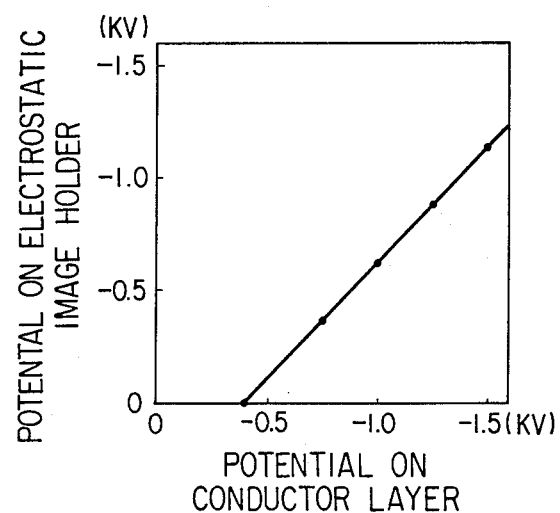
FIG. 12 is a diagram illustrating the charging characteristic of an embodiment of the charging device.
Figure 28:
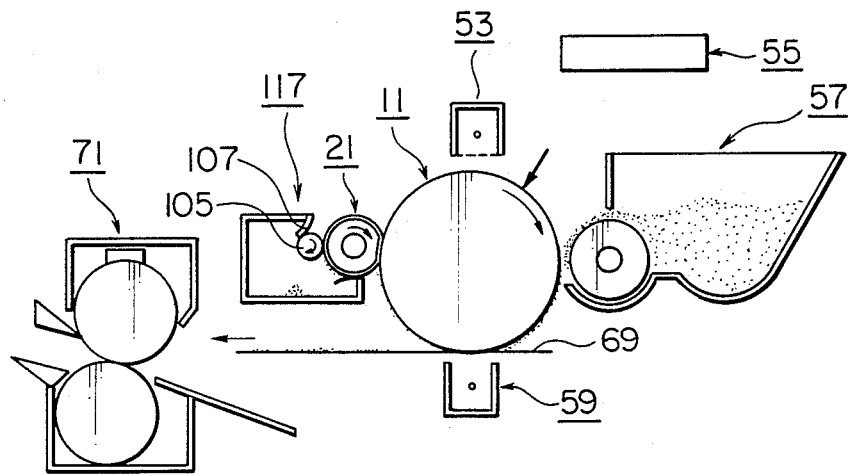
FIG. 28 is a cross sectional view illustrating an essential part of an embodiment of a discharging and cleaning device used in the electrophotographic apparatus.

A discharging and cleaning device of the present invention will be described below. FIG. 28 is a diagram illustrating the diversion of the elastic electroconductive roller 21 to the discharging and cleaning device. This construction was substantially the same as that of the charging and cleaning device illustrated in FIG. 27. To function, the discharging and cleaning device 115 of FIG. 27 had to be operated in such a manner that the voltage applied to the elastic electroconductive roller 21 would go to relieve the electrostatic latent image retaining layer 13 of its potential. Where the surface potential of the electrostatic latent image retaining layer 13 was in the range of 0 to +1,000 V, for example, the relation between the surface potential of the electrostatic latent image retaining layer 13 after the travel past the discharging and cleaning device 117 and the voltage applied to the elastic electroconductive roller 21 was virtually the same as illustrated in FIG. 12, so long as the difference of peripheral speed between the elastic electroconductive layer 13 was no less than 40 mm/s. In this case, however, the normally charged polarity of the toner was plus (+) and the electrostatic latent image retaining layer 13 was charged to plus. The cleaning was no more than 1–150 V, namely the difference between the potential of the electrostatic latent image retaining layer 13 before discharging and the applied voltage was no less than 150 V. Thus, the discharging and cleaning was attained by the application of a voltage in the range of −150 V to −400 V. The other conditions of the contact width and the blade 107 in this case were the same as those of the charging and cleaning device 103 of Example 11. The same restrictions as described in Example 11 were imposed where the toner charged to plus (+) was relieved of its potential and the polarity of normal charging was minus (−).

(EXAMPLE 13)

Developing and cleaning device

An example of the developing and cleaning device of the present invention will be described below.

Figure 29:
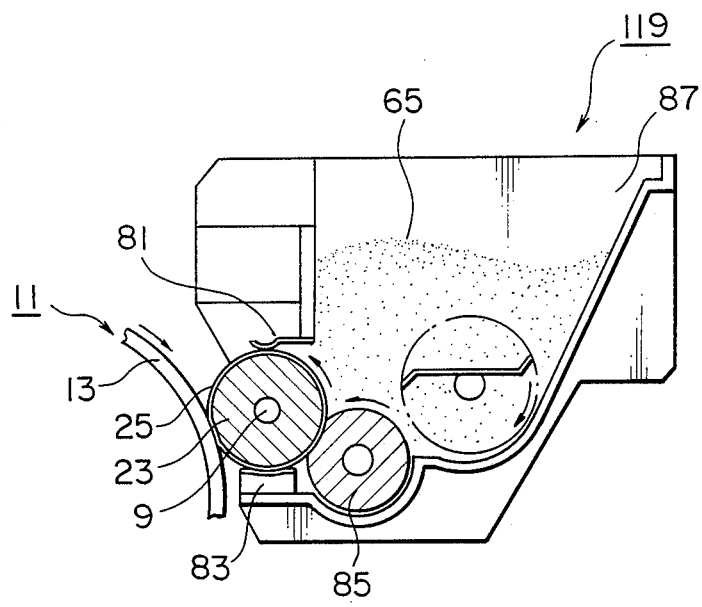
FIG. 29 is a cross sectional view illustrating an essential part of a developing and cleaning device.
Figure 30:
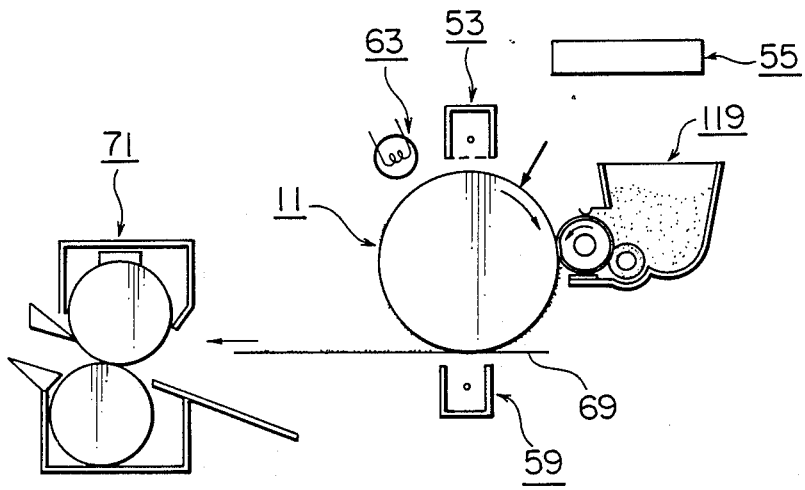
FIG. 30 is a cross sectional view illustrating an essential part of an embodiment of the developing and cleaning device used in the electrophotographic apparatus.
Figure 31A:
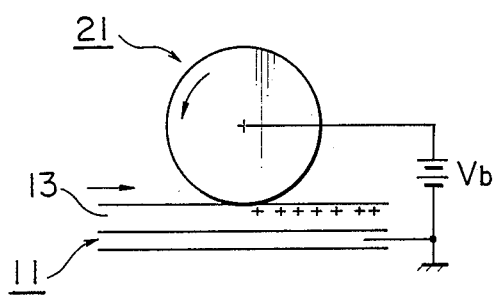
FIG. 31(a) is a cross sectional view illustrating an operating principle of the charging device.
Figure 31B:
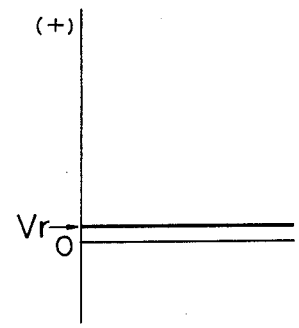
FIGS. 31(b), (c), and (d) are diagrams illustrating an operating principle of the charging device.
Figure 31C:
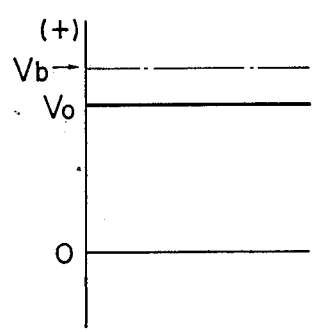
Figure 31D:
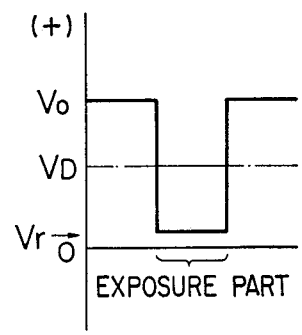
Figure 32A:
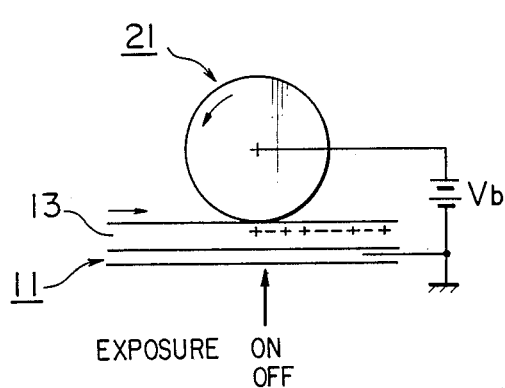
FIG. 32(a) is a cross sectional view illustrating an operating principle of an electrostatic latent image forming device.
Figure 32B:
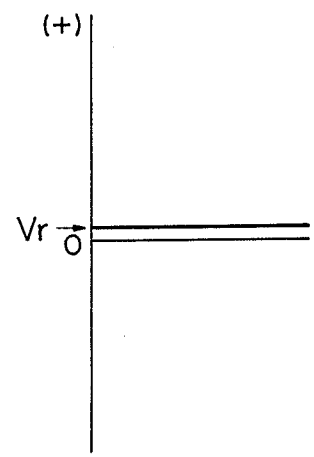
FIGS. 32(b), (c), and (d) are diagrams illustrating an operating principle of the electrostatic latent image forming device.
Figure 32C:
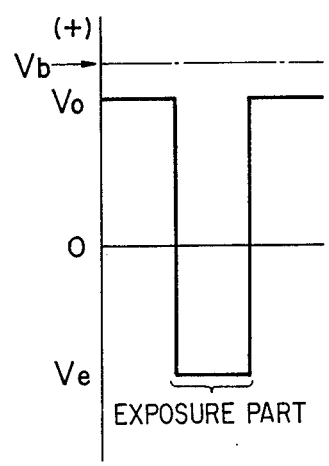
Figure 32D:
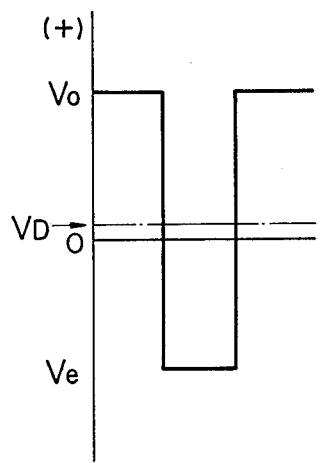

FIG. 29 is a cross sectional view illustrating an essential part of a developing and cleaning device 119 (so-called cleanerless electrophotographic device) and FIG. 30 is a diagram illustrating an electrophotographic apparatus using the developing and cleaning device 119.

The elastic electroconductive roller 21 used in the developing and cleaning device is the same as the aforementioned elastic electroconductive roller 43.

The toner layer forming member 81 was obtained by bending the leading end of a phosphor bronze sheet 0.2 mm in thickness in a semicircular shape of 2 mm inside diameter. Part was kept pressed against the surface of the elastic electroconductive roller 21 with a prescribed pressure. The recovery blade 83 adapted to prevent the toner from spilling, the toner feeding roller 85, and the electrostatic latent image retaining roll 11 were also kept pressed against the surface of tee elastic electroconductive roller 21.

The recovery blade 81 discharged the function of preventing the one-component non-magnetic toner 65 stored inside the toner container 87 from spilling out the developing device and, at the same time, causing the toner remaining after development on the surface of the elastic electroconductive roller 21 to be recovered into the toner container 87 without being spilled en route. In the present example, a polyurethane rubber sheet 0.5 mm in thickness superposed fast on a sponge was used. This polyurethane rubber sheet had the lateral surface thereof, except for the leading end, gently pressed against the elastic electroconductive roller 21, as illustrated in FIG. 29. The toner feeding roller 85 was formed of a soft polyurethane foam possessing a density of 75 kg/m$^3$ and a polyurethane foam cell number of 80/25 mm, with the contact depth into the elastic electroconductive roller 21 set at 0.5 mm and the peripheral speed of rotation at 2/1 that of the elastic electroconductive roller 21. When the toner layer forming member 81 was pressed against the elastic electroconductive roller 21 with a linear pressure of 80 g/cm, and the elastic electroconductive roller 21 was rotated at a peripheral speed of 94 mm /sec, a uniform toner layer was formed at a rate of 0.5 mg/cm$^2$ on the surface of the elastic electroconductive roller 21. When the toner layer was pneumatically aspirated and introduced into a Faraday cage, it was found by test to possess a potential of $-9.0$ $\mu$C/g. The toner 65 used herein was a negatively charging insulating blacktoner produced by dispersing carbon black in a polyester type resin. This toner was charged mainly by friction with the toner layer forming member 87.

In this example the aforementioned developing device 119 was used in the so-called laser beam printer adapted to form a latent image by exposing to a laser beam an organic photoconductor having the surface thereof negatively charged in advance and converting this latent image into a visibly developed image by the reversal development method and also used in an electrophotographic apparatus devoid of a cleaning device as illustrated in FIG. 30.

When the reversal development was performed with the potential of the image part or the potential of the exposed part set at $-50$ V, the potential of the non-image part or the potential of the unexposed part set at $-500$ V the developing bias (the voltage to be applied to the metallic shaft 9) set at $-250$ V, and the contact width between the electrostatic latent image retaining roll 11 and the elastic electroconductive roller 21 set at 1.5 mm, there was obtained a print sample containing a very sharp line image perfectly free from fogging.

Various parameters were studied as to their effects on the development to optimize the developing conditions.

First, the elastic electroconductive roller 21 was produced by forming the roller base 23 with an electroconductive NBR rubber having the magnitude of resistance adjusted to $10^2 \Omega$. cm by incorporation of electroconductive carbon, and forming on the surface of the roller base 23 an electroconductive polyurethane resin layer. This elastic electroconductive roller 21 was used for the aforementioned trial development. In this case, the print sample obtained contained an image having substantially the same quality as mentioned above, though the NBR rubber had a rather high rigidity of 40 degrees. When the trial development was performed by following the procedure described above, excepting chloroprene rubber possessing a magnitude of resistance of $1 \times 10^{13} \Omega$. cm, the effect of the developing bias was small and the developed image was poor in quality with a conspicuous sign of background fogging. When the same experiment was conducted using chlroprene rubber possessing a magnitude of resistance of $1 \times 10^{10} \Omega$. cm, the developed image was fine in quality with no sign of background fogging. These results dictate the requirement that the roller base 23 should be formed of an elastomer whose magnitude of resistance is no more than $1 \times 10^{10} \Omega$. cm.

Satisfactory properties were acquired when the actual magnitude of resistance between the metallic shaft 9 and the conductor layer 25 was no more than $1 \times 10^9 \Omega$. cm.

When the trial development was performed by using the elastic electroconductive roller 21 formed of NBR rubber of a varying rigidity, it was found that results desirable from the practical point of view were obtained with the rubber possessing rigidity of no less than 40 degrees as measured with a hardness tester, Type A, specified in JIS K 6301. When the rigidity exceeded 40 degrees, it was practically infeasible to increase the contact width between the electrostatic latent image retaining roll 11 and the elastic electroconductive roller 21 above 0.5 mm and the eccentricity or deformation of the elastic electroconductive roller 21 manifested their effects conspicuously in the form of uneven density in the developed image. It was found that NBR rubber of a rigidity of 26 degrees yielded satisfactory results.

The electroconductive polyurethane resin layer was studied with respect to the thickness to find the optimum range of thickness. The dipping method and the spray method were tried as means of application of the resin layer. It was found that with these methods, it was difficult from the practical point view to decrease the thickness of the conductor layer 25 below 1 $\mu$m. When the thickness was below this level, the lack of uniformity of the coating manifested itself in the form of uneven density of the image. The upper limit of this thickness cannot be generally fixed because it depends if not exclusively on the rigidity of NBR rubber. It was found, however, that for the rubber of rigidity in the range of 28 to 35 degrees, the thickness was desirably not more than 200 $\mu$m. When the thickness exceeded this upper limit, the conductor layer 25 failed to follow the elastic deformation of the NBR rubber and gathered wrinkles or sustained cracks.

The amount of the electroconductive carbon dispersed in the polyurethane resin was varied to find the carbon content fit for the optimization of the magnitude of resistance. When two samples of $1 \times 10^{10} \Omega$. cm and $1 \times 10^{11} \Omega$. cm were tested elaborately for developing property, it was found that the image with the latter sample of $3 \times 10^{11} \Omega$. cm showed a sign of background fogging. In the sample of $1 \times 10^{10} \Omega$. cm, the occurrence of background fogging could be curbed by setting the surface potential of the electrostatic latent image retaining layer 13 at $-700$ V and the developing bias at $-250$ V. More desirable results were obtained when the magnitude of resistance of the conductor layer 25 was no more than $10^8 \Omega$. cm. An image of fine quality free from fogging was obtained when the surface potential of the electrostatic latent image retaining layer 13 was $-500$ V.

Images of satisfactory quality were obtained also when the contact width between the elastic electroconductive roller 21 and the electrostatic latent image retaining roll 11 was in the range of 0.5 to 6 mm. When the contact width was no more than 0.5 mm, there was a conspicuous sign of nonuniform density. When it was no less than 6 mm, the phenomenon of fogging occurred conspicuously.

For production of developed images of satisfactory quality, the peripheral speed of rotation of the elastic electroconductive roller 21 was required to be in the range of 1.8 to 6.0 times that of the electrostatic latent image retaining roll 11. When this speed was no more than 1.8 times, the produced images suffered from deficiency in density and sharpness and produced fogging because of poor cleaning. When the speed exceeded 8.0 times, the images were blurred.

The poor cleaning and the consequent fogging observed when the peripheral speed was low occurred because the toner was not precisely charged normally. The cleaning was perfectly attained when the ratio of peripheral speed was no less than 1.8 times. It is important to note at this point that the conductor layer 25 must be made of a material capable of normally charging the toner by friction.

Images of equal quality were obtained when other species of the elastic electroconductive roller 21 were used in the electrophotographic apparatus. In the case of an electrophotographic apparatus adapted to effect exposure on the surface of the electrostatic latent image retaining layer 13 constructed as illustrated in FIG. 30, there are times when the toner remaining after transfer prevents the surface from being sufficiently exposed to light. When this apparatus is designed for resolution of no less than 35 dots/inch (DPI), the use of the device of this example in the apparatus is impracticable unless the transfer efficiency of the transfer device 59 is close to 100%.

With an apparatus whose resolution was no less than 35 DPI, the image obtained by the exposure from the surface was sufficient in quality so long as the transfer efficiency was no less than 75%. When the interior of the electrostatic latent image retaining roll 11 was made of a transparent material and the exposure was made from within, the image obtained in this example was fine in quality. The term "transfer efficiency" as used herein refers to the value, (ID TB—ID TA)÷ID TB×100 (%), wherein ID TB stands for the density of a given black solid image on the electrostatic latent image retaining roll 11 prior to transfer and ID TA for that after transfer.

When the electrostatic latent image retaining layer 13 capable of effecting exposure from within was used, the discharging device 63 disposed inside could be utilized effectively in relieving the electrostatic latent image retaining layer 13 of its potential through the agency of light.

(EXAMPLE 14)

Electrostatic latent image forming device

An example of the electrostatic latent image forming device of the present invention will be described below.

FIG. 31 is a diagram illustrating the operating principle of the charging device described above in Example 2 and the charging and surface potential of the electrostatic latent image retaining layer 13 using the charging device. In FIG. 31 (a), the elastic electroconductive roller 21 and the electrostatic latent image retaining layer 13 are in the state of mutual sliding contact. When a potential difference was established as illustrated herein, the surface of the electrostatic latent image retaining layer 13 was charged to plus (+). As regard variation of this state, the surface potential of the electrostatic latent image retaining layer 13 was Vr V closely approximating to 0 V as shown in FIG. 31 (b) before charging and then, at the time of charging, a potential of Vb V was applied to the surface as shown in FIG. 31 (c) and the surface potential of the electrostatic latent image retaining layer 13 was changed to Vo V. Thereafter, a latent image was formed by exposure to light. At the time of development, the potential of the exposed part of the surface of the electrostatic latent image retaining layer 13 was Vr V and the potential of the unexposed part thereof was Vo V as shown in FIG. 31 (d). During the course of the development, the developing bias V D was set at an intermedium between Vo and Vr and applied to the elastic electroconductive roller 21 so as to produce an image sufficient in density and free from fogging.

An example of the electrostatic latent image forming device provided with the elastic electroconductive roller 21 will be described below with reference to FIG. 32.

As illustrated in FIG. 32 (a), the elastic electroconductive roller 21 and the electrostatic latent image retaining layer 13 were held in sliding contact with each other and a potential difference was established. The electrostatic latent image retaining layer 13 had a back electrode made of a transparent material and, therefore, was able to effect the exposure from behind and produce a latent image with the aid of an exposure device (not shown). As illustrated in FIG. 32 (b), the surface potential of the electrostatic latent image retaining layer 13 was Vr V closely approximating to 0 V before the formation of the latent image. During the formation of the latent image, the potential of Vb B was applied to the surface as illustrated in FIG. 32 (c). In the unexposed part, the surface potential of the electrostatic latent image retaining layer 13 was Vo V similarly to that of FIG. 31. In the exposed part, migration of charge occurred inside the electrostatic latent image retaining layer 13 because an electric field was acting on the electrostatic latent image retaining layer 13. The surface potential of the electrostatic latent image retaining layer 13 in the exposed part, therefore, was Ve V of a polarity opposite from that of Vb V. The contrast of latent image (potential difference) in this case was large as compared with that of FIG. 31 (d). The relation $|Vo-Vr| < |Vo-Ve|$ was satisfied. The magnitude of Vb was allowed to be lower were the potential difference, $|Vo-Vr|$ was sufficient. Further, at the time of development, the developing bias VD was allowed to be lower than Vd of FIG. 31 (d) because it fell between Vo and Ve. The low-voltage power source of the level of 24 V, 12 V, or 5 V generally furnished for the electrophotographic apparatus, therefore, could be utilized for the generation of a developing bias. It was allowed even to lower this developing bias to 0 V. To attain this effect, the magnitude, Ve, was required to be large in some measure. In the present example, this increase of the magnitude was attained by setting the resistivity of the conductor layer 25 of the elastic electroconductive roller 21 in the range of $10^6$ to $10^9 \Omega$. cm. When this magnitude was not more than $10^6 \Omega$. cm, Ve approached 0 V. When it was no less than $10^9 \Omega$. cm, both $|Vo|$ and $|Ve|$ approached 0.

(EXAMPLE 15)

Electrostatic latent image forming device

An example of the electrostatic latent image forming device of the present invention will be described.

Figure 33:
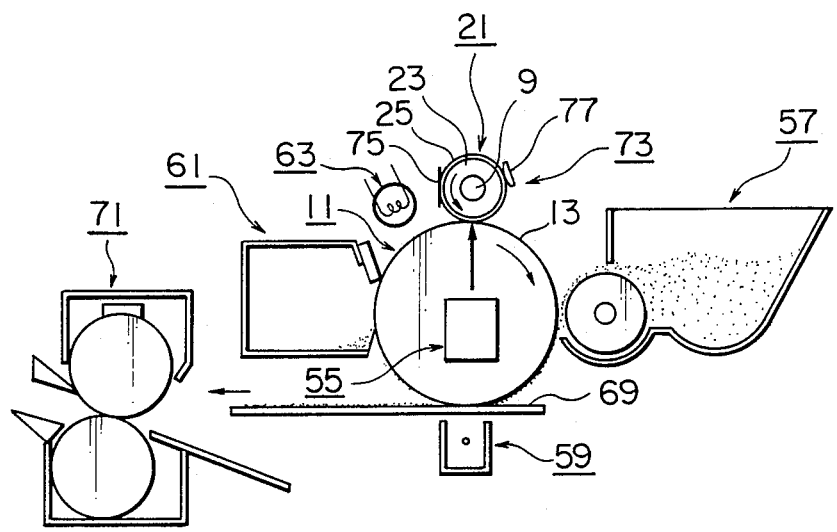
FIG. 33 is a cross sectional view illustrating an essential part of an embodiment of the electrostatic latent image forming device used in the electrophotographic apparatus.
Figure 34A:
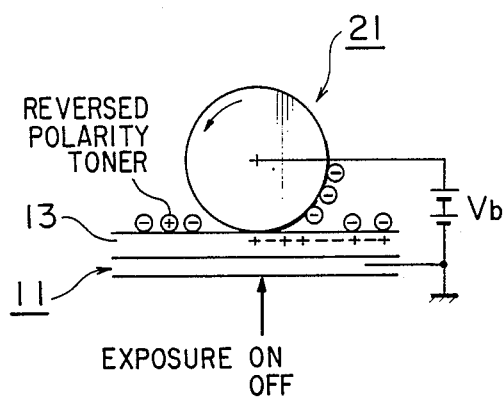
FIG. 34(a) is a cross sectional view illustrating an operating principle of an electrostatic latent image forming and cleaning device.
Figure 34B:
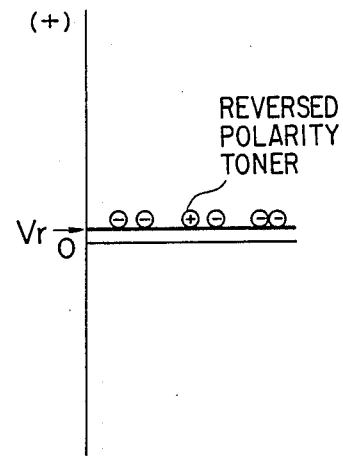
FIGS. 34(b), (c), and (d) are diagrams illustrating an operating principle of the electrostatic latent image forming and cleaning device.
Figure 34C:
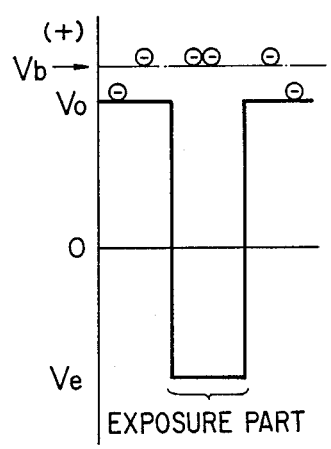
Figure 34D:
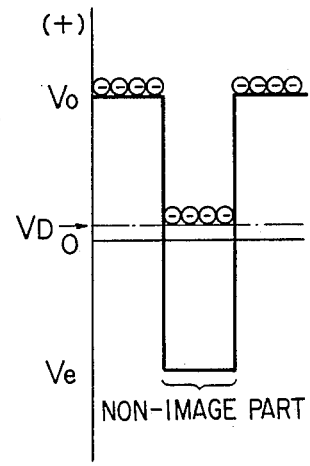

FIG. 33 is a diagram illustrating an electrophotographic apparatus using the electrostatic latent image forming device.

The electrophotographic latent image forming device of this example was composed of the charging device 73 and the example was composed of the charging device 73 and the exposure device 55.

The aforementioned elastic electroconductive roller 43 was used as the charging device 73. In this case, the magnitude of resistance of the conductor layer 25 was set at $10^7 \Omega$. cm. The peripheral speed of the electrostatic latent image retaining roll 11 was 47 mm/s and that of the elastic electroconductive roller 21 was 100 mm/s. The contact width of the roll 11 and the roller 21 was 2 mm. The electrostatic latent image retaining roll 11 was produced by forming the base thereof with glass to permit exposure from behind, superposing on this base a layer of ITO to serve as a transparent back electrode, and forming the electrostatic latent image retaining layer 13 on the ITO layer. Inside the electrostatic latent image retaining roll 11, the exposure device 55 composed of a LED array and an equal magnification lens was disposed so as to expose to light the so-called nip, the contacting parts of the elastic electroconductive roller 21 and the electrostatic latent image retaining roll 11. When the electrophotographic apparatus constructed as described above was operated to apply a charging bias voltage of 800 V to the elastic electroconductive roller 21, there was obtained a latent image having the unexposed part charged to 50 V and the exposed part to $-300$ V respectively. For the exposure to be effected to the best advantage, the position for this exposure with the exposure device 55 was required to fall in the range of 0.3 to 0.5 mm from the rear end of the aforementioned nip (the right end in the diagram). When the distance was no more than 0.3 mm, the charging potential of the exposed part was varied by change in the position of the nip. When the distance was no less than 0.5 mm, the exposure device was recharged after exposure and the charging potential approached 0 V. The other conditions were the same as those of the charging device mentioned above.

A transparent resin, for example, sufficed as the transparent base for the electrostatic latent image retaining roll 11. Some other transparent electrode sufficed for the back electrode. An electroconductive glass sufficed concurrently for the base and the back electrode.

(EXAMPLE 16)

Electrostatic latent image forming and cleaning device

An example of the electrostatic latent image forming and cleaning device of the present invention will be described.

Figure 35:
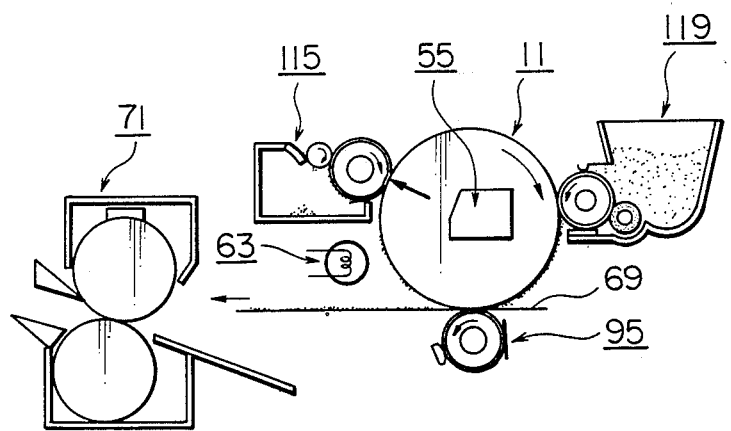
FIG. 35 is a cross sectional view illustrating an essential part of one example of the electrostatic latent image forming and cleaning device used in the electrophotographic apparatus.

The electrostatic latent image forming and cleaning device of the present example was composed of the charging and cleaning device 103 described in Example 11 and the exposure device 55 (FIG. 35).

FIG. 34 is a diagram illustrating the operating principle of the electrostatic latent image forming and cleaning device. FIG. 34(a) illustrates a set up identical with that of FIG. 32(a), except that the toner remaining after the transfer adheres to the electrostatic latent image retaining layer 13. As illustrated in FIG. 34, the toner particles denoted by plus ($+$) are those of reverse polarity and the toner particles denoted by minus ($-$) are those charged to normal polarity. The formation of an electrostatic latent image has been already described in Example 14. The description thereof is omitted here. The operation of cleaning involved in this example will be described. FIG. 34(b) depicts the state of the device prior to the electrostatic latent image formation and cleaning. In the state depicted in FIG. 34 (b), the toner remaining after the transfer rested on the electrostatic latent image retaining layer 13. Since, the surface potential of the electrostatic latent image retaining layer 13 was Vr, the diagram depicts the toner at the position of Vr to show that the toner rested on the electrostatic latent retaining layer 13. Then, FIG. 34(c) depicts the state in which the latent image was formed similarly to FIG. 32(c). In this case, the reversely polarized toner was normally charged by friction with elastic electroconductive roller 21. The surface of the electrostatic latent image retaining layer 13 was charged from Vr to Vo and Ve. Since the surface potential of the elastic electroconductive roller 21 was Vb, the toner resting on Ve was transferred to Vb by the electrostatic force due to the potential difference of Vb−Ve, namely to the elastic electroconductive roller 21, while the toner resting on Vo was transferred to Vb by the electrostatic force due to the potential difference of Vb−Vo. In consideration of the possibility that the toner would partly remain on Vo or the electrostatic latent image retaining layer 13 because the potential difference Vb−Vo was small, the diagram depicts part of the toner still remaining on Vo. The remaining toner implies that it escaped being removed by the cleaning operation. It is noted, however, that the remaining toner caused absolutely no trouble owing to the subsequent step of development. FIG. 34(d) depicts the state assumed during the course of the development. Vo denotes the surface potential or the developing bias of the developing roller. During the development, the toner resting on the developing roller was transferred to Vo by the electrostatic force due to the potential difference of Vo−Vb, or onto the electrostatic latent image retaining layer 13, to give rise to an image part. In the other part, the toner resting on the developing roller was caused to remain intact on the developing toner owing to the potential difference of Vo−Ve. This part formed a non-image part on the electrostatic latent image retaining layer 13. The toner which continued to remain on Vo in the state of FIG. 34 (c) went to form part of the image part. Actually, virtually all of the toner was removed in the state of FIG. 34 (c).

The so-called normal development in which the surface potential of the electrostatic latent image retaining layer 13 in the image part is plus ($+$) and the polarity of normal charging of the toner is minus ($-$) has been described with reference to examples. In the case of the reversal development in which the polarity of normal charging of the toner is plus ($+$) as in the foregoing examples, the cleaning to be effected in the state of FIG. 34 (c) required the toner to be thoroughly charged to the reverse polarity in spite of difficulty. In this case, the device may be used desirably in the following example.

FIG. 35 illustrates an electrophotographic apparatus using the electrostatic latent image forming and cleaning device (the combination of the charging and cleaning device 115 and the exposure device 55), the developing device 119, and the transfer device 95 of the present invention.

The charging and cleaning device 103 was that described in Example 11, the developing device 119 was that described in Example 13, and the transfer device 95 was that described in Example 6. The other components such as the electrostatic latent image retaining roll 11 and the exposure device 55 were the same as those described in Example 15. As the result, there was materialized an electrophotographic apparatus which had no use for any corona charging device.

(EXAMPLE 17)

Example 37 illustrated an electrophotographic apparatus using the electrostatic latent image forming device (the combination of the charging device 73 and the exposure device 55), the developing and cleaning device 119, and the transfer device of the present invention.

This electrophotographic apparatus was identical to that of Example 16, except that the electrostatic latent image forming device (the combination of the charging device 73 and the exposure device 55) of FIG. 33, described in Example 15, was used in the place of the electrostatic latent image forming and cleaning device (the combination of the charging and cleaning device 115 and the exposure device 55) of FIG. 35, described in Example 16. The operation and effect of this apparatus were virtually the same as those of the electrophotographic apparatus of FIG. 35. The operation of the part used as a replacement will be described below with reference to FIG. 36.

FIG. 36 (a) is a diagram illustrating the operating principle of the electrostatic latent image forming device. As illustrated in the diagram, the elastic electroconductive roller 21 and the electrostatic latent image retaining layer 13 were kept in sliding contact with each other and a potential difference was established. The formation of a latent image in the apparatus constructed as described above has already been explained in Example 12 and will not be repeated here. As illustrated in FIG. 36(a), the toner remaining after the transfer adhered to the electrostatic latent image retaining layer 13 prior to the formation of the latent image and it continued to remain on the electrostatic latent image retaining layer 13 even after the formation of the latent image. The diagram implies that no cleaning was effected. FIG. 37 illustrates the developing and cleaning device being operated to remove unnecessary toner and, at the same time, develop the latent image. This process will be described with reference to FIG. 36. FIG. 36(b) depicts the state assumed by the device prior to the formation of the latent image. The surface potential of the electrostatic latent image retaining layer 13 was Vr and the toner remaining after the transfer continued to remain on the electrostatic latent image retaining layer 13. Here, the polarity of normal charging of the toner taken as plus and denoted by (+). The symbol (−) denotes the toner of reverse polarity. FIG. 36(c) depicts the state assumed by the device during the formation of a latent image. In this case, the potential of the elastic electroconductive roller 21 was Vb and the electrostatic latent image retaining layer 13 was changed to Vo and Ve. The toner of reverse polarity was charged to plus (+) by friction with the elastic electroconductive roller 21. The toner on the electrostatic latent image retaining layer 13 was caused to remain on the electrostatic latent image retaining layer 13 by the electrostatic force due to the potential difference of Vb−Vo or Vb−Ve. FIG. 36(d) depicts the state assumed by the device during the developing and cleaning operation. The surface potential of the elastic electroconductive roller 21 was $V_D$ (developing bias). At the position of the surface potential, Vo, of the electrostatic latent image retaining layer 13, therefore, the toner resting on Vo was transferred to $V_D$ by the potential difference Vo−$V_D$. At the position of the surface potential, Ve, of the electrostatic latent image retaining layer 13, the toner on $V_D$ was transferred to Ve by the potential difference of Vo−Ve. The toner resting on Ve was allowed to remain as it was. Thus, during the developing and cleaning operation, the toner on Vo was recovered on the elastic electroconductive roller 21, and the toner was fed even from the elastic electroconductive roller 21 to the portion of Ve (for development). In this case, the toner of reverse polarity behaved to a contrary effect. The normal charging effected in the state of FIG. 36(c) resulted in improvement of the image quality. Even with the conventional developing device, the aforementioned effect (of cleaning) could be attained.

Figure 36A:
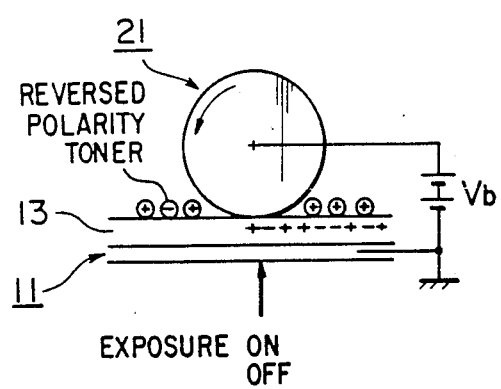
FIG. 36(a) is a cross sectional view illustrating an operating principle of the charging device.
Figure 36B:
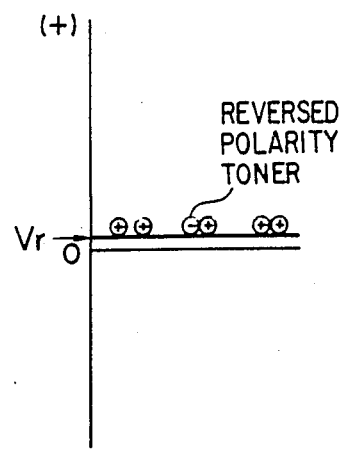
FIGS. 36(b)–36(d) show diagrams illustrating an operating principle of the combination of the contact charging device and the developing device.
Figure 36C:
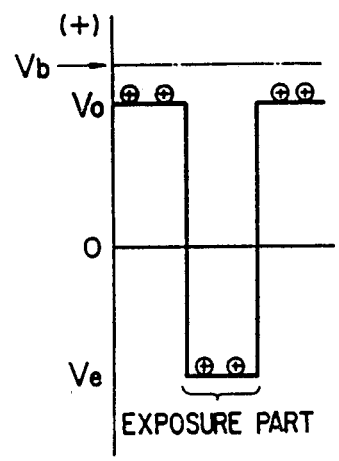
Figure 36D:
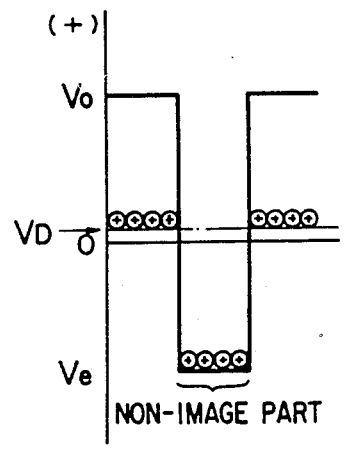
Figure 37:
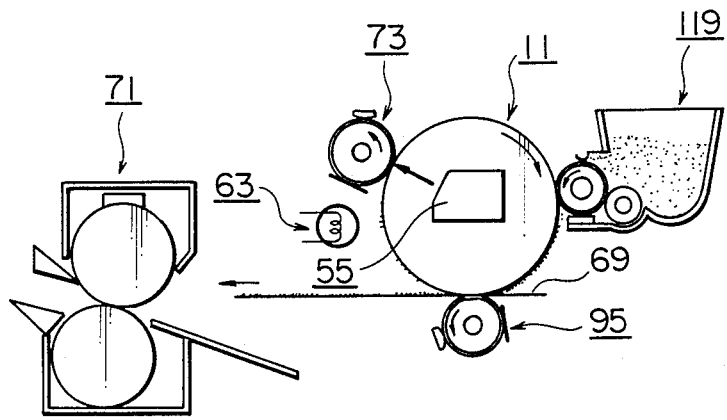
FIG. 37 is a cross sectional view illustrating an essential part of an embodiment of a cleanerless, coronaless, chargeless electrophotograhic apparatus.

Moreover, the otherwise possible waste of the toner could be avoided because the device avoided effecting the removal of the toner remaining after the transfer in the state of FIG. 36(c) and served as part of the device for recovery or development in the state of FIG. 36(d). Since the apparatus involved no waste of the toner, it found no use for the heretofore indispensable waste toner box and permitted a saving of floor space. The apparatus, therefore, was easy to maintain.

What is claimed is:

1. A developing device for forming a thin layer of toner on the surface of a toner carrier subjected to developing bias voltage and converting an electrostatic latent image into a visible image by causing said thin toner layer to contact an electrostatic latent image rataining layer, which developing device is characterized by being adjusted so as to satisfy the conditional formula:

$$|q|m \leq 100/vlR$$

wherein q stands for the magnitude of charging of said toner (C/g), m for the amount of said toner attached to the surface of said toner carrier per unit area of said surface (g/cm$^2$), v for the speed of movement of said toner carrier (cm/sec), l for the available length of said toner carrier (cm), and R ($\Omega$) for the magnitude of electric resistance between the surface of said toner carrier and means for application of said developing bias voltage.

2. The developing device of claim 1, wherein the width of contact between the surface of said toner carrier and the surface of said electrostatic latent image retaining layer is in the range of 0.3 mm to 6.0 mm.

3. The developing device of claim 2, wherein the pressure of contact between said toner carrier and said electrostatic latent image retaining layer is no more than 1 kg/cm$^2$.

4. The developing device of claim 3, wherein the depth of contact between said toner carrier and said electrostatic latent image retaining layer is in the range 0.1 mm to 2.0 mm.

5. The developing device of claim 4, wherein the roughness of the surface of said toner carrier is no more than 3 $\mu$m.

6. The developing device of claim 5, wherein means for forming said thin toner layer is an elastic member or a rigid member pressed against the surface of said toner carrier.

7. The developing device of claim 6, which is provided with means for applying such a voltage to the surface of said toner carrier that the absolute value of the potential difference between the image part of said electrostatic latent image and the surface of said toner carrier is no less than 100 V and no more than 600 V.

8. The developing device of claim 7, which is provided with means for applying such a voltage to the surface of said toner carrier that the absolute value of the potential difference between the non image part of said electrostatic latent image and the surface of said toner carrier is no less than 50 V.

9. The developing device of claim 1, wherein said toner carrier is an elastic electroconductive roller provided with an elastic roller base and a flexible conductive layer superposed on a periphery of said roller base and said toner carrier possesses an ability to produce a cleaning action.

10. A developing device according to claim 1, wherein the toner carrier is an electroconductive roller having an electroconductive elastomer layer formed on a periphery of a metallic shaft.

11. A developing device according to claim 1, wherein the toner carrier is an electroconductive roller composed of an elastic roller base and a conductive layer superposed on a periphery of the roller base.

12. A developing device according to claim 1, wherein the toner carrier is an electroconductive roller comprised of an elastic roller base which is composed of at least one material selected from the group of a soft polyurethane foam, a rubber sponge, and a polyurethane rubber, and a conductive layer superposed on a periphery of the roller base.

13. A developing device according to claim 1, wherein the toner carrier is an electroconductive roller comprised of an elastic roller base and a conductive layer superposed on a periphery of the roller base, said conductive layer being composed of a polyurethane resin having a fine electroconductive powder dispersed therein.

14. A developing device according to claim 1, wherein the toner carrier is an electroconductive roller comprised of an elastic roller base and a conductive layer superposed on a periphery of the roller base, said conductive layer being composed of a seamless tube comprised of at least one material selected from the group of polyester, polyurethane and polyethylene terephthalate.

15. A developing device according to claim 1, wherein the toner carrier is an electroconductive roller comprised of an elastic roller base and a conductive layer superposed on a periphery of the roller base, said conductive layer being formed of polyurethane resin and exhibiting an electric resistance of no more than $10^{12}\Omega$. cm.

16. A developing device according to claim 1, wherein the toner carrier is an electroconductive roller comprised of an elastic roller base, said roller base being composed of oilproof rubber possessing a rigidity of no more than 40 degrees, and a conductive layer superposed on a periphery of the roller base.

17. A developing device according to claim 1, wherein the toner carrier is an electroconductive roller comprised of an elastic roller base, a conductive layer superposed on a periphery of the roller base, and a resistor layer superposed on the conductive layer.

18. A developing device according to claim 1, wherein the toner carrier is an electroconductive roller comprised of an elastic roller base, a conductive layer superposed on a periphery of the roller base and a resistor layer superposed on the conductive layer, said resistor layer having an electric resistance exceeding $10^{12}\Omega$. cm.

19. A developing device according to claim 1, wherein the toner carrier is an electroconductive roller provided with an elastic roller base, a conductive layer superposed on a periphery of the roller base, and a resistor layer superposed on the conductive layer, said resistor layer having a thickness of no more than 0.5 mm.

20. The developing device according to claim 1, wherein the peripheral speed of the toner carrier in rotation is in the range of 1.5 to 7.0 times that of the electrostatic latent image retaining layer in rotation.

21. A developing device for forming a thin layer of toner on the surface of a toner carrier subjected to developing bias voltage and converting an electrostatic latent image into a visible image by causing said thin toner layer to contact an electrostatic latent image retaining layer, which developing device is characterized by being adjusted so as to satisfy the conditional formula:

$$R \leq 200I$$

wherein I (A) stands for the magnitude of a developing electric current and R ($\Omega$) for the magnitude of electric resistance between the surface of said toner carrier and means for application of said developing bias voltage.

22. A charging device incorporating therein an elastic electroconductive roller provided with an elastic roller base and a flexible conductive layer superposed on a periphery of said roller base, said conductive layer being formed of polyurethane resin and possessing a magnitude of resistance of no more than $10^{12}\Omega$. cm, said conductive layer directly contacting a latent image retaining layer.

23. A charging device according to claim 22, wherein the width of contact between the electrostatic latent image retaining layer and the elastic electroconductive roller is in the range of 0.3 to 8.0 mm.

24. A charging device according to claim 22, wherein the roller base is composed of at least one material selected from the group of a soft polyurethane foam, a rubber sponge, and polyurethane rubber.

25. A charging device according to claim 22, wherein the conductive layer is composed of a polyurethane resin having a fine electroconductive powder dispersed therein.

26. A charging device according to claim 22, wherein the conductive layer is composed of a seamless tube comprised of at least one material selected from the group of a polyester, a polyurethane, and a polyethylene terephthalate.

27. A charging device according to claim 22, wherein the conductive layer is formed of polyurethane resin and exhibits an electric resistance of no more than $10^{12}\Omega$. cm.

28. A charging device according to claim 22, wherein the elastic roller base is composed of oilproof rubber possessing a rigidity of no more than 40 degrees.

29. A charging device according to claim 22, wherein the electroconductive roller further includes a resistor layer superposed on the conductive layer.

30. A charging and cleaning device, characterized by incorporating therein an elastic electroconductive roller provided with an elastic roller base and a flexible conductive layer superposed on a periphery of said roller base, wherein said conductive layer directly contacts a latent image retaining layer.

31. A transfer device incorporating therein an elastic electroconductive roller provided with an elastic roller base and a flexible conductive layer superposed on a periphery of said roller base, said conductive layer being formed at least of polyurethane resin and possessing a magnitude of resistance of no more than $10^{12} \Omega$. cm, and wherein said conductive layer directly contacts a transfer material.

32. A discharging device, characterized by incorporating therein an elastic electroconductive roller provided with an elastic roller base and a flexible conductive layer superposed on a periphery of said roller base, wherein said conductive layer directly contacts a latent image retaining layer.

33. A discharging device according to claim 32, wherein the width of contact between the electrostatic latent image retaining layer and the elastic electroconductive roller is in the range of 0.3 to 8.0 mm.

34. A discharging device according to claim 32, wherein the elastic roller base is composed of at least one material selected from the group of a soft polyurethane foam, a rubber sponge, and a polyurethane rubber.

35. A discharging device according to claim 32, wherein the conductive layer is composed of a polyurethane resin having a fine electroconductive powder dispersed therein.

36. A discharging device according to claim 32, wherein the conductive layer is composed of a seamless tube comprised of at least one material selected from the group of a polyester, a polyurethane, and a polyethylene terephthalate.

37. A discharging device according to claim 32, wherein the conductive layer is formed of polyurethane resin and exhibits an electric resistance of no more than $10^{12} \Omega$. cm.

38. A discharging device according to claim 32, wherein the elastic roller base is composed of oilproof rubber possessing a rigidity of no more than 40 degrees.

39. A discharging and cleaning device, characterized by incorporating therein an elastic electroconductive roller provided with an elastic roller base and a flexible conductive layer superposed on a periphery of said roller base, wherein said conductive layer directly contacts a latent image retaining layer.

40. An electrostatic latent image forming device, characterized by the fact that discharging means incorporating therein an elastic electroconductive roller provided with an elastic roller base and a flexible conductive layer superposed on a periphery of said roller base and exposure means are opposed to each other through the medium of an electrostatic latent image retaining layer at least an exposure part of which is transparent.

41. An electrostatic latent image forming device according to claim 40 wherein the width of contact between the electrostatic latent image retaining layer and the elastic electroconductive roller is in the range of 0.3 to 8.0 mm.

42. An electrostatic latent image forming device according to claim 40, wherein the elastic roller base is composed of at least one material selected from the group of a soft polyurethane foam, a rubber sponge, and a polyurethane rubber.

43. An electrostatic latent image forming device according to claim 40, wherein the conductive layer is composed of a polyurethane resin having a fine electroconductive powder dispersed therein.

44. An electrostatic latent image forming device according to claim 40, wherein the conductive layer is composed of a seamless tube comprised of at least one material selected from the group of a polyester, a polyurethane and a polyethylene terephthalate.

45. An electrostatic latent image forming device according to claim 40, wherein the roller base comprises polyurethane resin and exhibits an electric resistance of no more than $10^{12} \Omega$. cm.

46. An electrostatic latent image forming device according to claim 40, wherein the elastic roller base is composed of oilproof rubber possessing a rigidity of no more than 40 degrees.

47. An electrostatic latent image forming and cleaning device, characterized by the fact that charging means incorporating therein an elastic electroconductive roller provided with an elastic roller base and a flexible conductive layer superposed on a periphery of said roller base and exposure means are opposed to each other through the medium of an electrostatic latent image retaining layer at least an exposure part of which is transparent.

48. A cleaning device, characterized by incorporating therein an elastic electroconductive roller provided with an elastic roller base and a flexible conductive layer superposed on a periphery of said roller base, wherein said conductor layer directly contacts a latent image retaining layer.

49. A cleaning device according to claim 48, wherein the width of contact between the electrostatic latent image retaining layer and the elastic electroconductive roller is in the range of 0.3 to 8.0 mm.

50. A cleaning device according to claim 48, wherein the elastic roller base is composed of at least one material selected from the group of soft polyurethane foam, a rubber sponge, and a polyurethane rubber.

51. A cleaning device according to claim 48, wherein the conductive layer is composed of a polyurethane resin having a fine electroconductive powder dispersed therein.

52. A cleaning device according to claim 48, wherein the conductive layer is composed of a seamless tube comprised of at least one material selected from the group of polyester, polyurethane, and polyethylene terephthalate.

53. A cleaning device according to claim 48, wherein the roller base is formed mainly of a polyurethane resin and exhibits an electric resistance of no more than $10^{12} \Omega$. cm.

54. A cleaning device according to claim 48, wherein the roller base is composed of oilproof rubber possessing a rigidity of no more than 40 degrees.

* * * * *

UNITED STATES PATENT AND TRADEMARK OFFICE
CERTIFICATE OF CORRECTION

PATENT NO. : 4,967,231
DATED : October 30, 1990
INVENTOR(S) : Hosoya et al.

It is certified that error appears in the above-identified patent and that said Letters Patent is hereby corrected as shown below:

Title Page, item [73], change "Electric Co., Ltd.," to --Tokyo Electric Co., Ltd,--
Title Page, Foreign Application Priority Data, insert as additional data --Sep. 30, 1988  63-246857--; and --Jul. 30, 1988  63-191602--
Column 1, line 53, change "bush" to --brush--
Column 3, line 66, change "if" to --it--
Column 8, line 1, change "$|q|$ =<100/v $\ell$ R" to --$|q|m \leq 100/v \ell R$--
Column 10, line 22, change "I,R" to --I'R--
Column 10, line 31, change "I,R" to --I'R--
Column 16, line 23, after "roller", delete "as"
Column 21, line 61, change "one example" to --an embodiment--
Column 28, line 61, after "case", delete "of"
Column 29, line 47, change "=<" to -- $\leq$ --
Claim 1, column 48, lines 38 and 39, change "rataining" to --retaining--
Claim 21, column 50, line 30, change "R $\leq$ 200I" to --R $\leq$ 200/I--
Claim 40, column 51, line 56, change "discharging" to --charging--

Signed and Sealed this

Thirteenth Day of June, 1995

*Attest:*

BRUCE LEHMAN

*Attesting Officer*   Commissioner of Patents and Trademarks